US006543695B1

(12) United States Patent
Hamilton et al.

(10) Patent No.: US 6,543,695 B1
(45) Date of Patent: Apr. 8, 2003

(54) HOUSING FOR HAND HELD SCANNER

(75) Inventors: Alistair Hamilton, Stony Brook, NY (US); Sudhir Bhatia, Ridgewood, NJ (US); Philip Swift, Winchester, MA (US); Chinh-Hung Jwo, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/538,812

(22) Filed: Mar. 30, 2000

Related U.S. Application Data

(63) Continuation-in-part of application No. 29/116,604, filed on Jan. 6, 2000, now Pat. No. Des. 431,562, and a continuation-in-part of application No. 29/116,597, filed on Jan. 6, 2000, now Pat. No. Des. 430,159, and a continuation-in-part of application No. 29/116,589, filed on Jan. 6, 2000, now Pat. No. Des. 430,158, and a continuation-in-part of application No. 29/116,606, filed on Jan. 6, 2000, now Pat. No. Des. 436,104, and a continuation-in-part of application No. 08/691,263, filed on Aug. 2, 1996, now abandoned.

(51) Int. Cl.$^7$ ................................................ G06K 7/10
(52) U.S. Cl. ........................... 235/462.43; 235/462.45; 235/472.01
(58) Field of Search ........................ 235/462.43, 462.44, 235/462.45, 462.15, 472.01, 486, 454

(56) References Cited

U.S. PATENT DOCUMENTS 3,971,957 A * 7/1976 Hase ........................... 307/64
4,295,181 A * 10/1981 Chang et al. ................. 361/395
4,503,494 A * 3/1985 Hamilton et al. ............ 364/200
4,633,418 A * 12/1986 Bishop ......................... 364/554
4,766,299 A * 8/1988 Tierney et al. ............... 235/472
4,866,257 A   9/1989 Elliott et al. ................. 235/436
4,868,375 A   9/1989 Blanford .................. 235/462.25
5,331,547 A   7/1994 Laszio ..................... 364/413.01
5,381,020 A * 1/1995 Kochis et al. ............... 250/566
5,587,577 A * 12/1996 Schultz ....................... 235/472
5,602,380 A * 2/1997 Bishay ........................ 235/472
5,612,659 A * 3/1997 Kerber ........................ 335/177
D392,282 S   3/1998 Ahearn et al. ............. D14/116
5,801,918 A   9/1998 Ahearn et al. ............... 361/683
D400,871 S   11/1998 Ahearn et al. ............. D14/116
D414,760 S * 10/1999 Hetfield et al. ............ D14/116
5,962,837 A * 10/1999 Main et al. ............. 235/462.44
6,064,502 A * 5/2000 Burns et al. ................. 359/152
6,101,372 A * 8/2000 Kubo ........................... 455/90

FOREIGN PATENT DOCUMENTS

JP   406208642  * 7/1994 ............ G06K/7/10

* cited by examiner

Primary Examiner—Michael G. Lee
Assistant Examiner—Daniel St. Cyr

(57) ABSTRACT

A housing for a hand-held scanner has an upper surface having a front portion and a rear portion, a lower surface having a front portion and a rear portion, side surfaces between the upper and lower surfaces and a first groove in the lower surface between the front portion and rear portion for receiving a finger of a hand holding the housing during use. The side surfaces have second grooves therein extending from the first groove towards the rear portion of the upper and lower surfaces a sufficient distance to receive the tips of at least two fingers of a hand holding the housing during use.

11 Claims, 18 Drawing Sheets

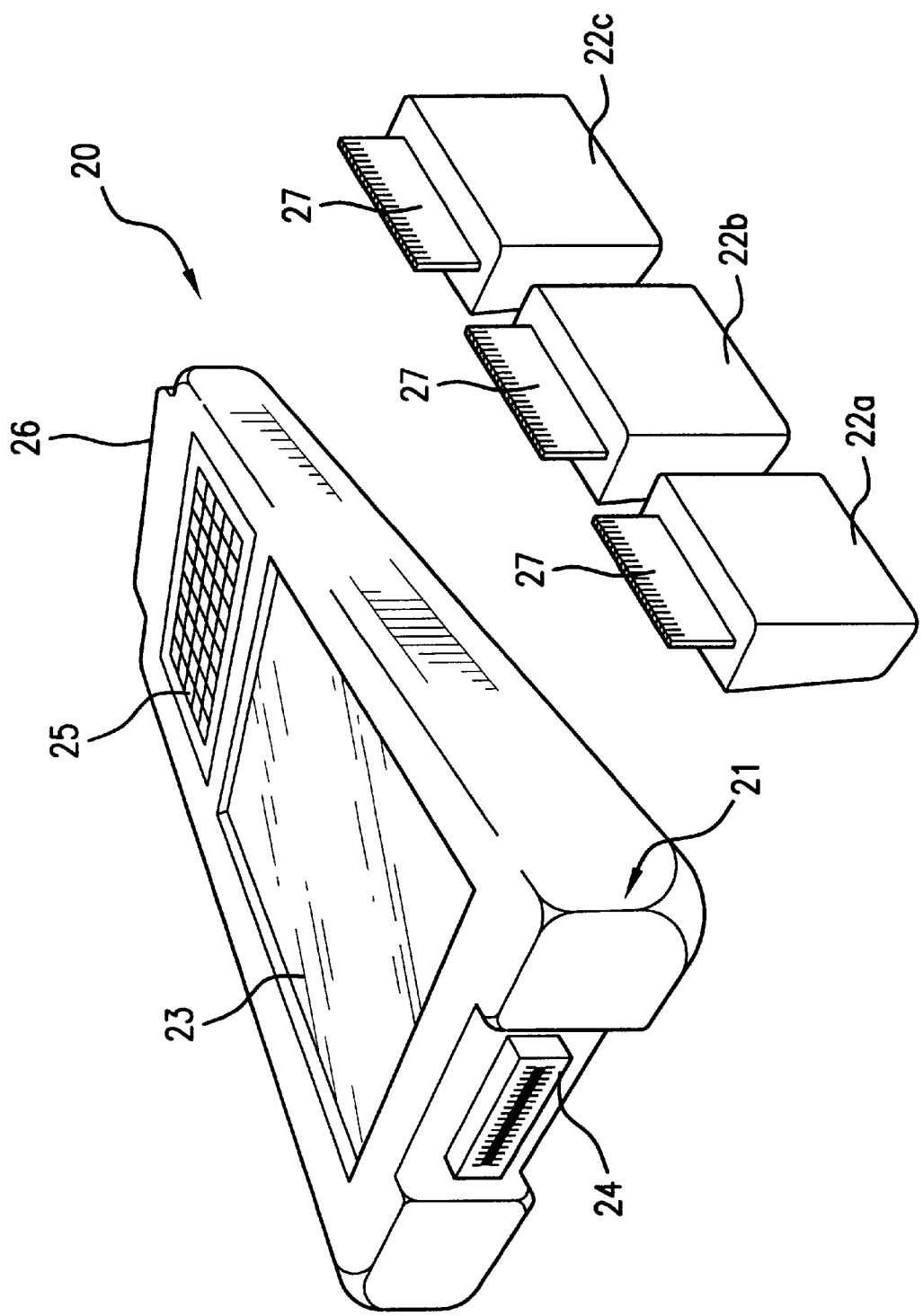

HOUSING FOR HAND HELD SCANNER

This application is a continuation-in-part application of application Ser. No. 08/691,263 filed Aug. 2, 1996, now abandoned and Ser. No. 29/116,604, now U.S. Pat. No. D,431,562 Ser. No. 29/116,597, now U.S. Pat. No. D,430,159 Ser. No. 29/116,589 now U.S. Pat. No. D,430,158 and Ser. No. 29/116,606 now U.S. Pat. No. D,436,104 all filed Jan. 6, 2000 and all pending.

BACKGROUND OF THE INVENTION

1. Field of the Invention

The invention relates to hand-held optical readers or scanners for reading an indicia such as a bar code symbol, in particular hand-held optical readers or scanners having an ergonomic design.

Another aspect of the invention relates to a housing for an optical scanner or reader having an ergonomic design.

In another aspect the invention relates to a portable computer device and to a housing for a portable computer device.

2. Description of the Related Art

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilized as an input to a data processing system for applications in point of sale processing, inventory control and the like.

Known scanning systems comprise a light source for generating a light beam incident on a bar code symbol and a light receiver for receiving the reflected light and decoding the information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol.

Known hand-held optical readers are often in the shape of a gun having a handle portion and a barrel portion. The reading window through which the light beam passes is generally located at the end face of the barrel portion, and the reader is aimed at the indicia to be read by the operator holding the handle portion. A trigger is situated in the region of the junction between the handle portion and the barrel portion for operation by the user to actuate the optical reader.

It is desired to further improve the known system by introducing an ergonomically designed hand-held reader. Such a reader could be aimed yet more accurately at the indicia to be read, as a result of which the indicia to be read could be located more quickly and read by the reading arrangement correspondingly quickly resulting in a reduction of the time and possibly an extension of the battery life of the reader. In addition, a reader having such an improved shape will be easier to hold by the operator and will, over a long period of time, reduce the operator's discomfort, enabling the operator to use the reader for longer periods of time. As will be seen, therefore, the improved ergonomic design would allow increased efficiency, cost-effectiveness and user-friendliness.

In addition, there are known portable hand-held computers for collecting data and down-loading the data to a central or peripheral device. The down-loaded data may be raw data or data that has been processed within the hand-held computer. Data collection can be carried out by entering information to the hand-held computer via a keypad, or by incorporating in the computer an optical reader for example for reading bar code symbols, or incorporating a reader for reading a magnetic card strip.

For example, when information about various products is required during inventorying, those products may bear bar code symbols or magnetic strips, or have associated magnetic strip cards which are read by the hand-held computer. The data collected can be transferred from the hand-held computer to a central or peripheral device by known means such as radio frequency radio links, wired connections, infra-red communications or other known transmission arrangements.

Often, more than one data capture system is required for a given application. The manufacture of a customized system for a specific application is expensive and difficult to modify if it is subsequently desired to incorporate further data capture options than those originally provided in the customized device.

In another aspect high density or two-dimensional bar code labels have traditionally been used to store a portable data record. A high density system replaces the one-dimensional keyed lookup transaction required by one-dimensional barcode systems.

SUMMARY OF THE INVENTION

OBJECTS OF THE INVENTION

It is an object of the present invention to provide an arrangement comprising a further improvement over the prior art. It is a further object to provide a hand-held reader of improved ergonomic design.

It is a further object of the invention to provide a hand-held optical reader capable of being used quickly and efficiently and with minimum discomfort to the user.

It is a further object of the invention to provide a portable computer device easily modifiable for different multi-media applications.

It is a further object of the invention to provide a bar code scanner control system having a wide range of applications and capable of communicating with a bar code scanner over a wireless link.

FEATURES OF THE PRESENT INVENTION

According to the invention there is provided a hand-held optical reader for reading printed indicia comprising a housing and a reading arrangement, the reading arrangement being provided in the housing, wherein the housing is of a generally flattened elongate bar-shape having generally opposing upper and lower broad faces, shallow side faces and front and rear ends, wherein the housing is shaped generally downwardly concave when viewed from a side and includes a bulbous portion projecting from the lower face at the rear, wherein the rear end of the upper and lower faces is rounded when viewed from above, wherein the reading arrangement includes a trigger and a reading window, the trigger being located on the upper face of the housing, and the window being located on the front end face of the housing, and wherein the housing is configured to be held and operated by the user comfortably and efficiently. In particular, the rounded rear end and bulbous portion of the housing are shaped to fit comfortably into the operator's hand and the trigger is conveniently located for operation by the user's finger or thumb. As a result of the ergonomic design, the user can hold and operate the reader for longer periods of time without discomfort. In addition, the window being placed at the front of the bar-shaped housing allows more accuracy in locating and aiming at a bar code symbol to be read allowing an increase in the number of scans made in a given period and a reduction in battery drain. The bulbous portion stay extend from a rear edge of the upper face to substantially the longitudinal mid-point of the lower face and the trigger may be arranged substantially aligned with the point at which the bulbous portion meets the lower face. A concave groove may be provided at the forward face of the bulbous portion and extending around either side of the bulbous portion. The reader is thus yet more easily gripped and operated.

One or more finger grips may be provided on the housing to improve the user's grip. The grips may be provided on the bulbous portion and/or on the upper face of the housing.

An information display may be situated on the upper face of the housing.

A keypad may be provided on the upper face of the housing, allowing information concerning the operator's identity, mode of operation and so forth to be entered. An acoustic modem may be provided for up-loading and/or down-loading information read by the reader, and/or an interface connector may be provided for connecting the reader to a central computer for up-loading or down-loading information, and/or a radio transmitter may be provided for transmitting information to a remote receiver, and/or a radio receiver may be provided for receiving information frost a remote transmitter. In any case, information may be transferred to a central storage device allowing space reduction on the reader itself.

A battery housing may be situated within the bulbous portion. The battery housing may be arranged to receive batteries along a surface substantially matching the external surface of the bulbous portion, as a result of which the housing may be kept compact, maximum use of the bulbous portion being made.

The reader may be configured symmetrically for use by left-handed or right-handed operators or configured either for right-hand users or for left-hand users. The reading arrangement may be a "flying spot" optical scanner or an imager.

According to the invention, there is further provided a hand-held optical scanner for reading a printed indicia comprising a housing and a scanning arrangement including a light source for scanning a beam across an indicia and a light detector for receiving light reflected by the indicia, the scanning arrangement being provided in the housing, wherein the housing is of a generally flattened elongate bar-shape having generally opposing upper and lower broad faces, shallow side faces and front and rear ends, wherein the housing is shaped generally downwardly concave when viewed from a side and includes a bulbous portion projecting from the lower face at the rear, wherein the rear end of the upper and lower faces is rounded when viewed from above, wherein the scanning arrangement includes a trigger and a scanning window, the trigger being located on the upper face of the housing, and the window being located on the front end face of the housing, and wherein the housing is so configured to be held and operated by the user comfortably and efficiently.

According to the invention, there is further provided a hand-held field of view optical reader for reading printed indicia comprising a light source for illuminating an indicia and a detector for receiving light reflected from the indicia, the reading arrangement being provided in the housing, wherein the housing is of a generally flattened elongate bar-shape having generally opposing upper and lower broad faces, shallow side faces and front and rear ends, wherein the housing is shaped generally downwardly concave when viewed from a side and includes a bulbous portion projecting from the lower face at the rear, wherein the rear end of the upper and lower faces is, rounded when viewed from above, wherein the reading arrangement includes a trigger and a reading window, the trigger being located on the upper face of the housing, and the window being located on the front end face of the housing, and wherein the housing is so configured to be held and operated by the user comfortably and efficiently.

According to the invention, there is further provided a portable computer device comprising a main body and at least one data collection/communications module connectable to the main body, the main body including an interface for connection with the module, a processor for processing information received from the module and a communication link for exchanging information with a host. Because of the modular arrangement the device may be easily adapted to different applications without the requirement to manufacture costly customized systems or to modify such systems which would prove expensive and complex.

The main body may include a visual display, for example an LCD display. The main body may also comprise a keypad. The modules may comprise an image capture module, a laser scanner module and/or a multi-media module. The modules preferably include digital signal processing sub-systems which may be of a single design and programmable as appropriate. The modules may comprise pre-processors or preprocessing information prior to transfer to the main body to reduce the burden on the processor in the main body. The module may be movably mounted on or relative to the main body, and in particular to the display on the main body for example it may be hinged pivotally or rotatably mounted.

According to the invention, a housing for a hand held scanner has an upper surface having a front portion and a rear portion, a lower surface having a front portion and a rear portion, side surfaces between the upper and lower surfaces and a first groove in the lower surface between the front portion and rear portion for receiving a finger of a hand holding the housing during use. The side surfaces have second grooves therein extending from the first groove towards the rear portion of the upper and lower surfaces a sufficient distance to receive the tips of at least two fingers of a hand holding the housing during use. The second grooves preferably extend substantially to the rear portion of the upper and lower surfaces.

The size of the upper surface is preferably greater than the size of the lower surface and the side surfaces taper gradually from the upper surface to the lower surface.

The upper surface of the housing preferably has a thumb activated switch disposed opposite the first groove in the lower surface. When a keypad is included on the upper surface, the upper surface preferably has a flange at the rear portion thereof and extending upwardly from the rear surface and at least partially surrounding the keyboard.

The invention also includes a housing having a lower surface having a first fastener thereon for a strap disposed at the rear portion thereof and second fasteners for the strap at the side surfaces adjacent the front portion of the lower surface. A strap is fastened between the first fastener and one of the second fasteners is at a diagonal and extends over fingers of a hand holding the housing between the knuckles and the first joints thereof.

The housing preferably also has a rounded front portion of the lower surface and a rest extending therefrom. The lower surface has a battery holder compartment with a resting surface. The front and rear resting surfaces maintain the housing in a stable position when placed on a planar surface.

Further in accordance with the invention, the housing has a rear surface between the upper and lower surfaces having an infrared outlet and wherein the housing is configured to form a direct line of sight from the infrared outlet to a belt pack worn by a user holding the housing in one hand during use.

Still further in accordance with the invention, the lower surface of the housing has a battery chamber for receiving a battery pack and including contacts for connecting to contacts on the battery pack and a sensor in the battery chamber sensing the removal of the battery pack from the battery chamber before the contacts of the battery pack disconnect form the contacts in the battery chamber. The battery sensor is preferably sealed.

Moreover, the lower surface has a battery chamber for receiving a battery pack and a integrated circuit socket in the bottom of the chamber and covered by a removable door for receiving an integrated circuit.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings identical and in which:

FIG. 9 shows a portable computer device according to another aspect of the invention;

DETAILED DESCRIPTION OF THE PREFERRED EMBODIMENTS

Referring now to FIGS. 1 to 4, the optical reader has a rear end 4 and a generally planar front end 5, an upper face 2a and opposed to that a lower face 2b.

Figure 6:
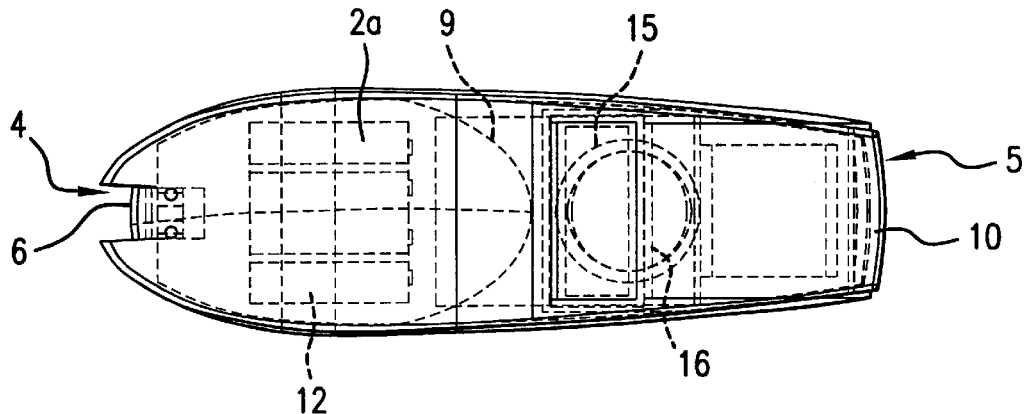
FIG. 6 is a view of the optical reader from above showing hidden detail.

Referring to FIGS. 1 to 4 in more detail, the optical reader includes a generally bar-shaped elongate housing indicated generally by the reference numeral 1, having two generally opposed long broad upper and lower faces 2a, 2b (see also FIG. 7), two generally opposed long, shallow side faces 3, a rear end 4 and a front end 5 (see also FIG. 6).

Figure 5:
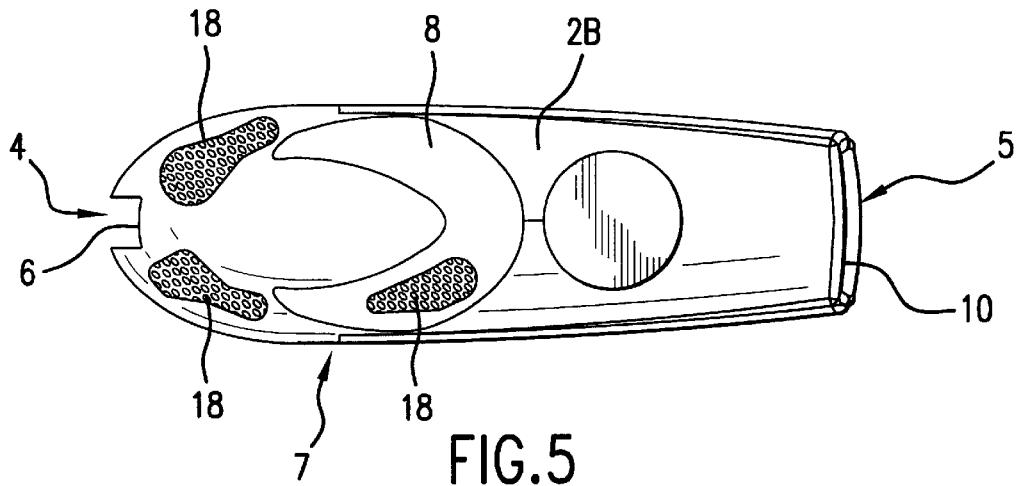
FIG. 5 is a view of the optical reader from below.

As can be seen from FIGS. 5 and 6, the upper and lower faces 2a, 2b of the reader comprise side edges having substantially straight front portions tapering inwardly towards the front end 5 which is of a convex shape having a large radius of curvature. The rear portions of the side edges curve inwardly and meet so that the rear end 4 of the housing is generally elliptical in shape when viewed from above. The rear end is interrupted by a recessed connector 6 which is described in more detail below. The housing is configured to be held by a user with the rear end mounted in the palm of the user and it will be seen, therefore, that the curved end of the 10 housing when viewed from above will facilitate holding by the user.

Figure 7:
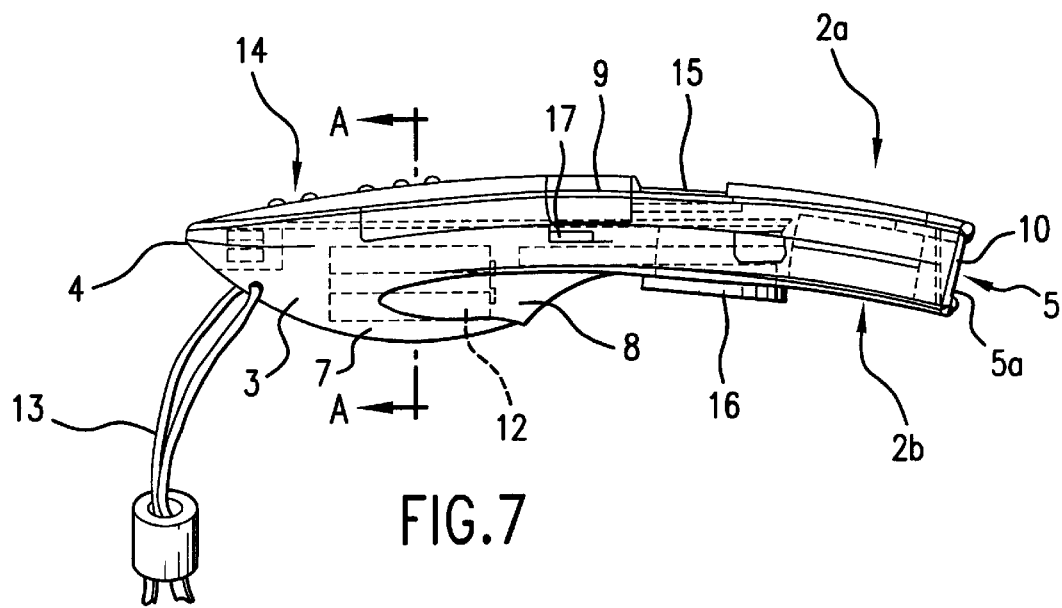
FIG. 7 is a side view of the optical reader showing hidden detail.

Referring to FIG. 7 the side faces 3 of the housing comprise substantially parallel downwardly curved long edges and a substantially straight front edge 5a. A bulbous convex rear portion 7 extends from the rear end of the upper edge 3a to approximately the center of the lower edge. A concave groove 8 is provided in the frontward part of the bulbous portion 7 extending around both sides of the bulbous portion 7 to approximately the mid point of the bulbous portion 7 on either side. As a result the reader is yet more suitable to be gripped towards the rearward end by the operator, the bulbous portion 7 fitting into the palm of the operator and the concave groove providing improved grip and fit with the operator's hand.

A reading arrangement is mounted within the housing. The reading arrangement may be any known conventional arrangement, for example a "flying spot" optical scanner or an imager. Generally the arrangement will include a light generating source such as a laser diode, a beam focusing or directing arrangement and a light receiving device. Where the reading arrangement is an optical scanner a rapidly oscillatable scan component, such as a mirror is provided to scan the light beam across an indicia to be read. Alternatively, the laser diode itself can be oscillated. Where the reader is a field of view optical reader, a charge coupled device (CCD) array or a photodetector arrangement is provided to detect the reflected light beam.

In order to actuate the reading arrangement a scan trigger 9 is provided on the upper surface 2a of the housing 1. In the arrangement shown the trigger 9 comprises a cut-out strip extending transverse to the longitudinal axis of the housing 1 and across the whole of the upper face and part of each of the side faces 3 and ii situated approximately half way along the upper face 2a. The trigger 9 is activated by depression and is positioned along the housing 1 such that it is easily actuable by the operator when the reader is held in the operator's hand. The trigger mechanism itself may be of any known arrangement; for example the trigger may be spring-loaded and have contacts which form a circuit with contacts within the housing when the trigger is depressed to actuate the reading arrangement. Power may therefore be conserved as the reader will only be activated when the trigger is depressed enabling the operator to leave the reader idle when no indicia are to be read. Once again, as the trigger is positioned with ergonomic considerations in mind, the reader can be simply and quickly operated by the user with minimum discomfort.

A scanning window 10 is positioned on the front face 5 of the reader. Light generated by the reading arrangement passes through the window 10 and is reflected and scattered back through the window 10 by a bar code symbol. Accordingly, the reader can be easily and accurately aimed at the bar code symbol 11 to be read (as shown illustratively in FIG. 2). As a result the bar code symbol 11 can be rapidly located by the user and read by the reader with a minimum amount of time wasted attempting to locate the bar code symbol 11. Accordingly, both operator time and usage time can be reduced which is of particular relevance in battery-powered hand-held readers.

Figure 1:
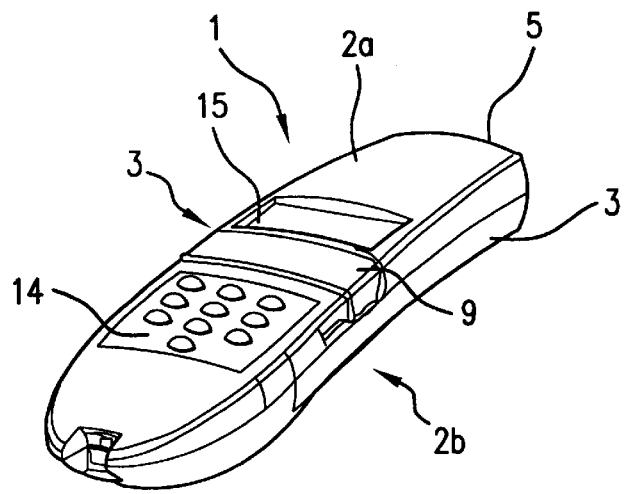
FIG. 1 is a perspective view of an optical reader according to the present invention from above and the rear.
Figure 3:
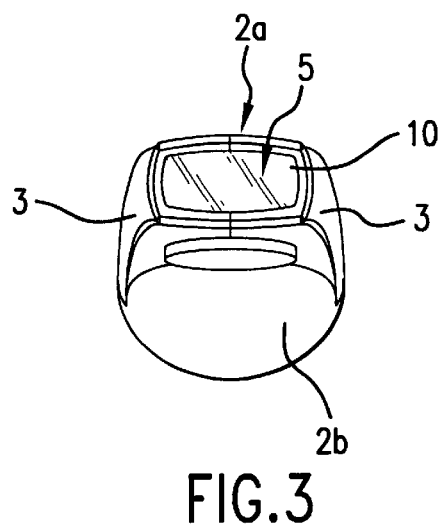
FIG. 3 is a perspective view of the from the front and tilted upwardly.
Figure 2:
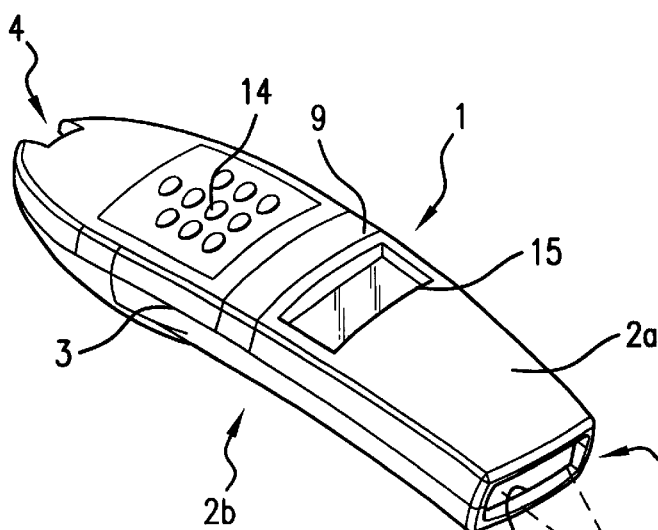
FIG. 2 is a perspective view of the of FIG. 1 from above and the front.
Figure 4:
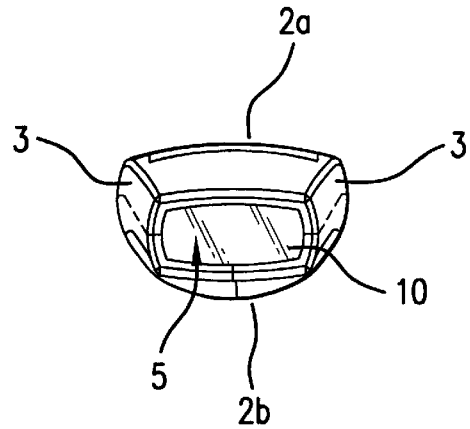
FIG. 4 is a view of the optical reader from the front.
Figure 8:
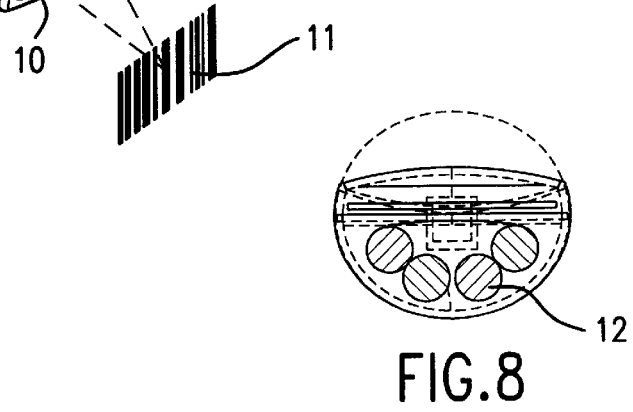
FIG. 8 is a sectional view of the optical reader along the line A—A shown in FIG. 7.

As shown in FIGS. 6, 7 and 8, the batteries 12 for the hand-held reader are stored in the bulbous portion 7 towards the rear and aligned with the longitudinal axis of the reader. The batteries 12 are disposed along a curved surface matching the curvature of the bulbous portion. As a result, maximum use is made of the ergonomically design bulbous portion 7 of the reader and minimum space is occupied by the batteries 12.

A strap 13 can be attached to the reader, for example towards the rear of the bulbous portion 7 for placing around the operator's wrist such that, in the event of the reader being inadvertently released from the grip of the user, it is still held to the user by the strap 13.

Also provided on the upper face of the reader are a keypad 14 and a display 15. (The keypad 14 is not shown in FIG. 6 for the purpose of clarity). The keypad 14 may be used to initialize the reading arrangement such that identification information concerning the user is entered into the system. Alternatively, the keypad 14 may be used to enter predetermined codes or information concerning modes of operation of the reader or to carry out cancellation or manipulation operations on information provided by the reader. The display 15 may display information relating to the mode of operation of the reader, or display check information relating to the item carrying the bar code symbol being read together with background information such as the time, date, and confirmation of the operator's identity. Preferably the display 15 is a liquid crystal display (LCD).

The reading arrangement can process information derived from the bar code symbols directly or can send raw data to an external processing device which can then process the information accordingly. In addition, information derived by the reader from bar code symbols can be transferred to a memory device in order that a database of information can be built up. For example where the reader is used at a point of sale, buying patterns can be stored and analyzed. Alternatively, if the reader is being used for inventorying purposes then the inventory information can be stored. The optical reader can transmit information in a variety of manners. In the embodiments shown various different transmitting devices are provided; in practice only one or more of the devices need be provided depending on the particular use to which the reader is to be put. For example, the information may be transmitted by an acoustic modem 16. In that case, information can be stored in a buffer memory within the reader and then downloaded by the acoustic modem 16 at predetermined intervals. The display 15 could indicate when information is to be downloaded. Alternatively an interface connector, for example, an RS41 connector is designated by reference numeral 6 and provided at the rear of the reader. Suitable cabling can be inserted into the connector 6 to download information or alternatively to load data into the reader for example relating to the mode of operation. Once again, the display 15 could provide an indication of the functioning of the connector. The cable could be permanently connected to the reader as the connector 6 is provided at the rear of the reader and hence would not be obscured by the user's hand. Alternatively, the connector 6 could be connected to a cable for loading or downloading of information when required and, for example, when indicated, by display 15. In addition, a radio 17 or other transmitting device can be provided within the housing 1 to allow real time data communication. An advantage of that arrangement is that the operator may use the reader in a "cordless" or "wireless" configuration allowing increased mobility. Once again the radio 17 could comprise a transmitter and a receiver in order that information can be sent to and from a remote processor. The radio link could be replaced by an infra-red communication link or other wireless link of known type. Because the reader is of ergonomic design, the transfer of information is easily carried out while the reader is actually in use, if required.

In order to improve the operator's grip on the reader, one or more finger grips may be provided at locations where, in use, the operator's fingers or other parts of the operator's hand would contact the reader. The finger grip would comprise a molded rubber portion having raised elements to achieve traction on the finger or palm. Such finger grips could be provided, for example, on the bulbous portion 7 (as shown schematically in FIG. 5 by reference numeral 18) or the concave groove 8 therein, on or in the vicinity of the trigger portion or in areas of the upper surface 2a where the operator's thumb might rest.

Accordingly, it will be seen that the hand-held optical reader described herein is ergonomically shaped for maximum user ease and comfort, allowing increased efficiency and user-friendliness. Features such as the trigger 9 and finger grips 18 are positioned for optimum user operability. It will be appreciated that such features may be presented symmetrically in order to allow the terminal to be used by either left or right-handed users, or alternatively the handset may be produced in both left and right-handed versions. The reading window 10 is positioned for improved accuracy and ease of use, and features such as the key pad 14 and display 15 are positioned for ease of access and reference by the user. The device may be either wireless or connected to a central processor by a cord leading from the connector 6 provided at a convenient position on the terminal. The device can be powered by batteries 12 located conveniently along the curve of the bulbous grip portion 7 or could in the alternative be powered by a removable, rechargeable battery pack or via a cord into the above-mentioned inter-connector or another connector.

According to another aspect there is shown in FIG. 9 a data collection device comprising an improvement over known arrangements. The device comprises a portable hand-held computer for collecting data and downloading the raw processed data to a central or peripheral device. The device, designated generally as 20 comprises a main body 21 and interchangeable data collection modules 22a, 22b, 22c.

The main body 21 is provided internally with data processing means (not shown) and also comprises a display screen 23, for example an LCD display screen capable of displaying video images, a data collection module interface 24, an optional input information keypad 25 and a communication link 26 which may comprise radio frequency or infra-red transmitting means or an interface for downloading information to a central or peripheral device via a physical cable. It will be appreciated that the LCD display 23 and input keypad 25 are optional features. Advantageously, however, they allow the user to configure operation of the device as a whole quickly and simply and monitor the operation. The main body is shown schematically in FIG. 9; in practice it could assume an ergonomic shape such as that shown in FIGS. 1 to 7, suitable interfaces, etc. being positioned as appropriate, for example at respective ends of the module.

It will be appreciated that the device may transfer information to a host via any electronic data transfer scheme for example the system could also use cellular-based telephone channels.

Alternatively, the device could be configured for connection to a telecommunications network or computer network, for example the "Internet".

The data collection modules are inter-changeable with one another and may be, for example, CCD (Charge Coupled Device) based image, video and bar code symbol data capture modules, audio transducers for collecting and receiving sound information, laser scanners or combined multi-media data collection modules.

An image capture module using a CCD could be used for capturing images of objects for storage or use by a processor application carried out by the main body or by a host, much images including for example people, landscapes, homes and vehicles for reference applications. In addition, the imager could be used for one dimensional or two dimensional bar code symbols for decoding data capture. A laser optical reader scanning module and decoder would be used generally for bar code data capture and decoding. Other data acquisition uses are possible.

Figure 11:
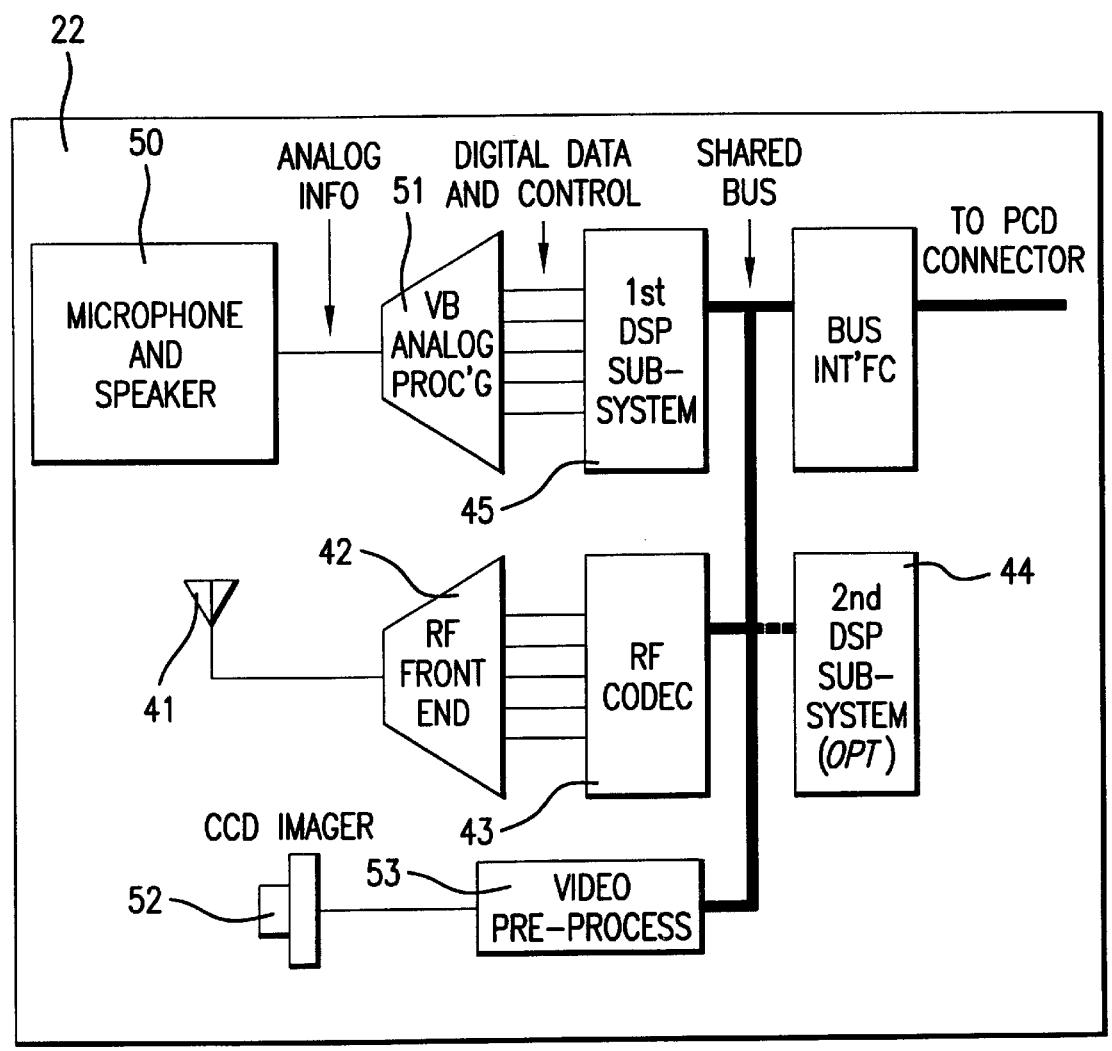
FIG. 11 is a block diagram of a multi-media module for the device of FIG. 9.

A multi-media module 22 is shown in FIG. 11 and discussed in more detail with reference to that figure below. Such a module could contain a circuitry for image/video capture, audio capture and playback and a cellular telephony sub-system. Such a module would be of particular use in teleconferencing and live video communications over cellular networks from the portable unit.

The desired data collection module 22a, b, c is connected to the main body 21 by the interface 24 on the main body which mates with an interface 27 on the module. Any suitable known interface components can be used but the components should be strong, relatively inflexible, durable and suitable for frequent disconnection and reconnection.

The modules are powered by a power supply within the main body of the portable computing device and may be partially or totally controlled by software drivers within the main body. In order to reduce the burden on the central processing unit of the main body, dedicated signal processing electronics within the modules can be arranged to perform up-front data processing as a result of which a common bus architecture to the main body is shared by all of the modules. As a result their interchangeability is enhanced.

Figure 10:
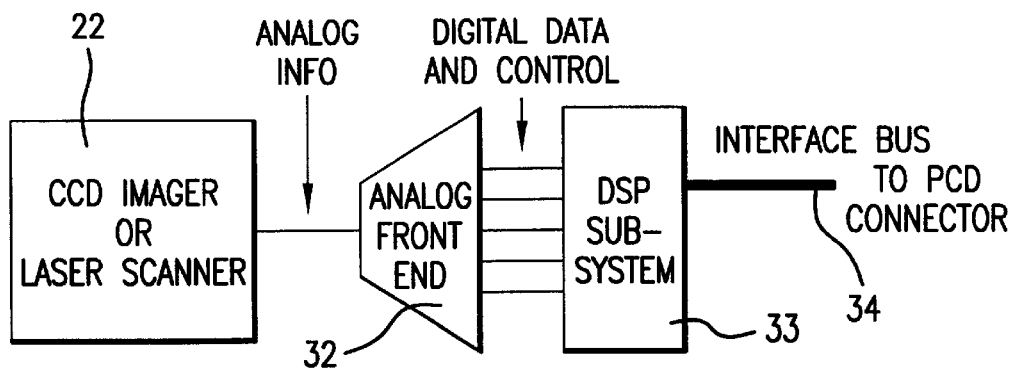
FIG. 10 is a block diagram of an image capture module for the device of FIG. 9.

A suitable architecture for an optical media capture module 28 (for example containing a CCD imager or laser scanner) is shown in FIG. 10. Each module may contain only the media capture electronics without any preprocessing capability or, as discussed above, preferably contains dedicated or programmable analog components 32 and digital signal processing (DSP) components 33 to ease the processing load placed on the central processing unit of the main body 21. The signal processing subsystem 32, 33 in the module may be of a single electronic design common to different modules, and which is either programmed in the factory or customized on purchase or programmable by the user to perform the functions in processors if required by the particular media module. This function programmability is expected to be mainly through software, since the module processing electronics is flexible, and these software components may be one time or dynamically loaded to the module via the main body central processing unit. Accordingly, the range of components that require manufacture is decreased, appropriate dedicated parts of the components being selectable for a desired use, or a portion of the mode of operation being borne by software.

In operation, the module 28 collects information via the CCD imager or laser scanner in analog form which is transferred either serially or by conversion into a parallel format. The analog signal is then processed by the signal processing sub-system 32, 33 and forwarded to an interface bus 34 from which the information is transferred to the main body of the portable computing device. As mentioned above, the signal processing electronics preferably perform up-front data processing such that a common bus architecture to the portable computing device 21 can be achieved.

Referring now to FIG. 11, the multi-media module 22 includes circuitry for image/video capture, audio capture and playback and a cellular telephony sub-system.

The module is arranged to receive and transmit video information independently of the main body of the portable computing device (although the video information may also be accessed by the main body of the portable computing device in order to monitor or review the information). Accordingly, a radio frequency antenna 41 is provided in the module for reception and transmission of radio frequency and information. A radio frequency front end processor 42 and codec 43 cooperate to perform digital to radio frequency and radio frequency to digital format conversions. Video information received via radio frequency is decompressed by an optional digital signal processing subsystem 44 for presentation, where appropriate, to the CPU of the main body 21 of the portable computing device. A further digital signal processing sub-system 45 is provided for other purposes (discussed in more detail below) and preferably performs partial video processing, the CPU of the personal computing device completing the process for displaying the results. The second digital signal processing sub-system 44 may also be required for the interface to the radio frequency codec 43 of the cellular sub-system; this depends on the amount of processing required for each function. Video information transferred to the main body 21 of the portable computing device is displayed on the LCD display 23. The radio frequency receiving, transmitting and processing apparatus 41, 42, 43, 44 discussed above can optionally reside in a separate component such as a PCMCIA or other type plug-in card for example of the type manufactured by Symbol Technologies, Inc. Preferably, however, the circuit forms an integral part of the multi-media module to provide a full wireless multi-media solution for the hand-held computing system. As will be appreciated, the wireless link may conform to any desired cellular standard (for example CDMA, GSM, AMPS) that is preferably selected to allow the widest application of the invention.

The multi-media module 22 further includes a microphone/speaker component 50 which receives and transfers input analog information to an analog to digital converter 51 comprising an up-front voice-band converter 51 which transfers information either serially or in parallel to the digital signal processing sub-system 45. Similarly, information may be transmitted in the other direction, for example digital information from the main body of the portable computer device is converted to an analog audio signal at converter 51 and converted to sound by the speaker component 50. Base-band digital audio data is processed by the digital signal processing sub-system 45 which can be reprogrammed as appropriate to perform appropriate audio codec processing. Voice-band (VB) signals are converted by the converter 51 as discussed above.

Video data is captured by a CCD imager 52 compressed by a digital signal processing sub-system 53 and forwarded to the radio frequency codec 43. Once again the main body of the portable computing device need not be involved in this data transfer unless the user decides to monitor the transfer. In that case, a software controlled process may be initiated whereby the video data is sent to the CPU of the main body 23 of the portable computing device for display before compression as well as to the radio frequency codec 43 for transmission allowing the captured image to be viewed while or before transmitting.

The multi-media module 22 is preferably mounted so as to be rotatable through at least 180° when connected with the main body of the portable computing device. This may be achieved by hinging or pivoting or otherwise arranging a portion of the main body or by similarly arranging a portion of the module. This positioning allows capture of the user's image while the user can simultaneously view the LCD screen display for received video data or images. The rotation of the image capture portion of the module permits capture of images of objects in front of the user while the user is looking at the screen.

The microphone and speaker combination may be arranged to face the user in a preferred, standard configuration of the device as a whole. The microphone may further be configured to swing or swivel away from the main body of the portable computer device and from the user holding the device if the desired audio data to be captured emanates from another direction.

Figure 12:
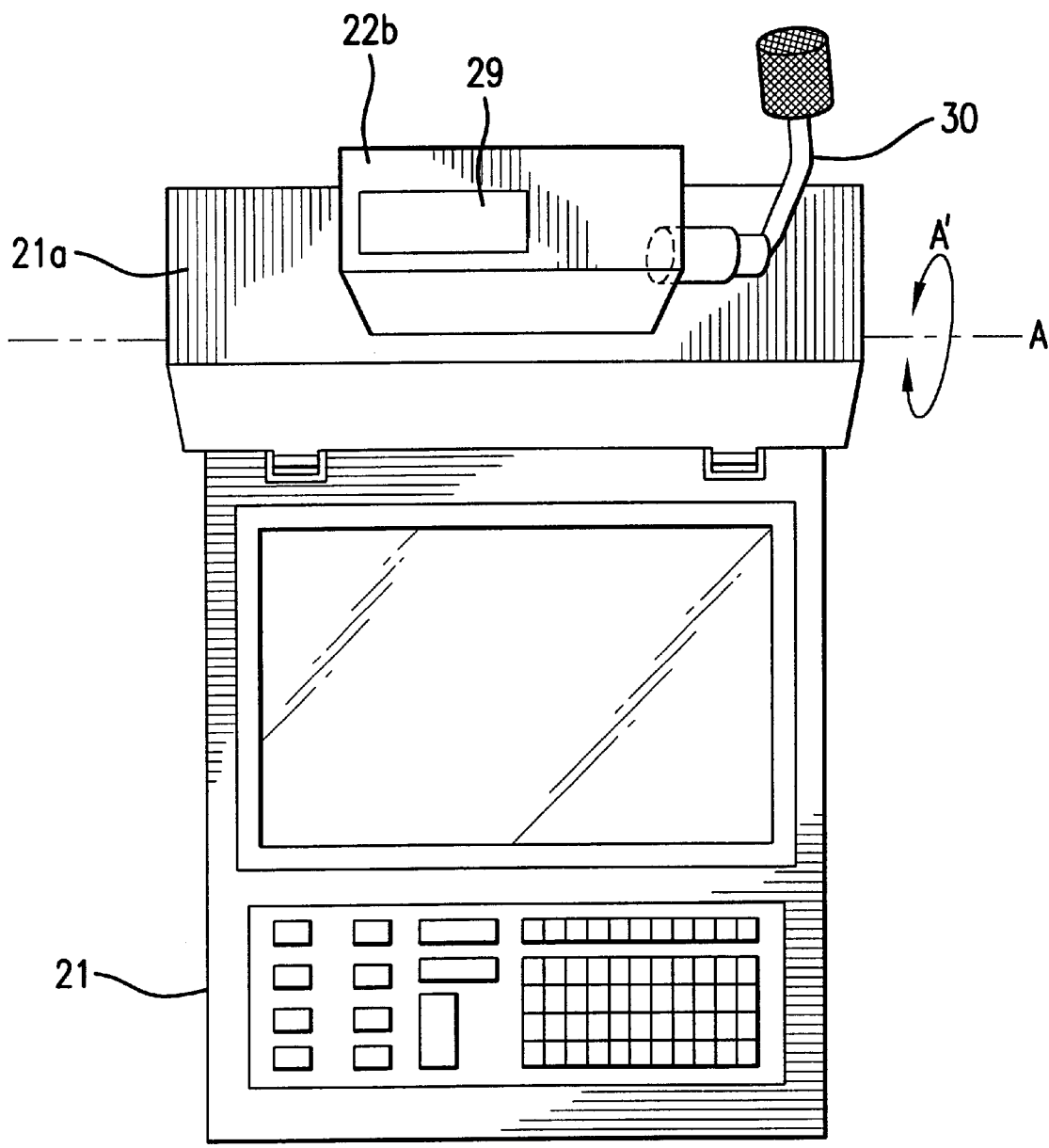
FIG. 12 is a perspective view of a variation of the device of FIG. 9.

An appropriate arrangement including a pivotable module head 22 and a swingable microphone boom 30 is shown in FIG. 12. In the embodiment shown, an upper portion 21a of the main body 21 is hinged to the remainder of the main body and rotatable around an axis A as shown by arrow A'. The multi-media module 22 is connected to the upper portion and the upper portion has been swiveled such that a CCD image capture device 29 faces the user. The pivotable microphone boom 30 also extends from the multi-media module 22. It will be appreciated that a number of pivoting orientating arrangements can be provided, for example a hinge or pivot could be provided within the structure of the module 22, and the module could also be arranged to rotate through 180° about an axis transverse to axis A. Similarly, the microphone boom 30 can be pivotally mounted to the module 22 in any known manner.

Accordingly, it will be seen that the invention can be used to provide modular programmable multi-media facilities in the hand-held form factor by portable computing devices such as hand-held terminals or "portable digital assistants". The invention can be used for CCD based bar code decoding (in one or two dimensions at least) by industrial and commercial users, for example for point of sale processing or inventorying; portable, cellular video conferences by traveling business users; and digital photography/image capture for insurance assessors, sales professionals among many other applications that will be apparent to those skilled in the art. It will be appreciated that the portable modules discussed above may be used in cordless scanning implementations for example in point of sale applications. Problems arise where such portable devices are not tethered in some manner as it is possible that they will be lost, removed from the store, or otherwise misappropriated.

To overcome this, it is possible to put surveillance tags of a known type into the scanner such that if the scanner is accidentally taken by a customer an alarm will sound at the front of the store as it would if any other product carrying such a surveillance tag was carried out of the store.

Alternatively, the scanner can have some form of internal alarm which sounds if the scanner is taken more than a predetermined distance from the base. Where the scanner communicates with the base by wireless communications such as radio communication, the software protocol managing the radio session could control the range finder and alarm.

In order to locate portable scanners that have been misplaced, an alarm or "beeper" can be placed in the scanner and triggered by a signal from the base controlled by, for example, a button on the base pressed by the user. Accordingly, when the user pressed a button the scanner could be located by following the source of the sound.

FIGS. 13–27 illustrate alternative embodiments of a housing for use with the scanners and scanner terminals of FIGS. 1–12.

Referring now to FIGS. 13–17, the hand-held optical reader includes the housing 100 for a scanner and terminal, including a keyboard 102 on an upper surface 101 and having an LCD display 106 at the front portion 101A of the upper surface. The keyboard is at the rear portion 101B of the upper surface.

The terminal housing also includes LED's 107 and 108 and a thumb operated switch 104 having a rest area 103 therearound. The switch 104 is used, for example, to initiate scanning.

Figure 28:
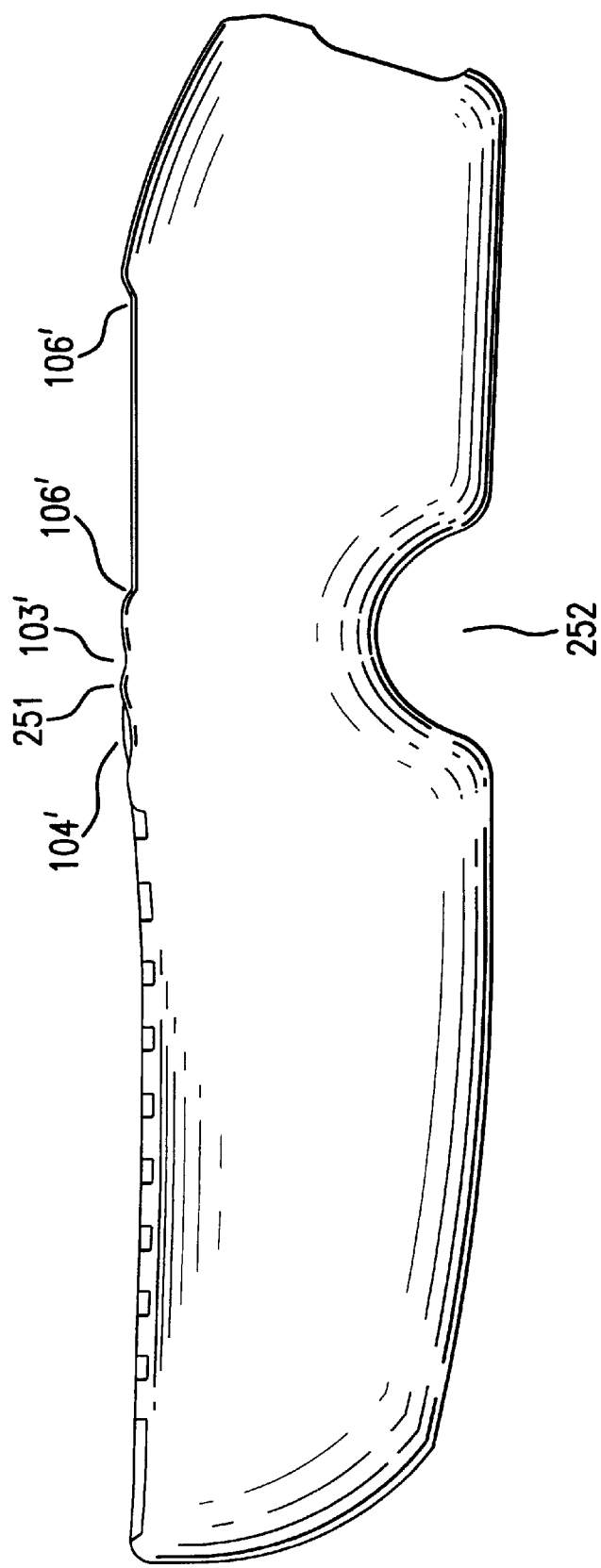
FIG. 28 is a side view of another embodiment of the housing according to the present invention.

FIG. 28 shows an alternative configuration of the terminal and the use of the rest area. As shown therein, there is a scan trigger 104' and a finger rest 103' between the trigger and the display 106'. The finger rest is a concave dip with a slight ridge 251 to prevent the finger from inadvertantly activating the scan trigger. The scan trigger and rest are substantially opposite groove 252 in the bottom surface which receives a fore finger of a hand holding the terminal during use.

The upper surface 101 also includes a flange 105 extending upwardly from the rear portion of the upper surface and at least partially surrounding the keyboard 102. This flange 105 acts as protection against the inadvertent actuation of the keys of the keyboard 102 when the device is laid on a flat surface or when a plan a object is placed on the keyboard.

The bottom surface of the housing 111 includes a front portion 111A and a rear portion 111B. Intermediate of the front and rear portions is a groove 112 for receiving a fore finger F of a hand H holding the housing during use.

The housing also includes second grooves 113, 114 which extend rearwardly from the first groove and continuously therefrom and are in the side surfaces 121A and 121B of the housing. The recesses 113, 114 allow the bottom portion of the housing to be more easily gripped than the upper surface of the housing and allow the tips T of the fingers of a hand H holding the housing during use to be received therein. If the user is right handed, then the fingertips will be on the opposite side in groove 114.

Figure 18:
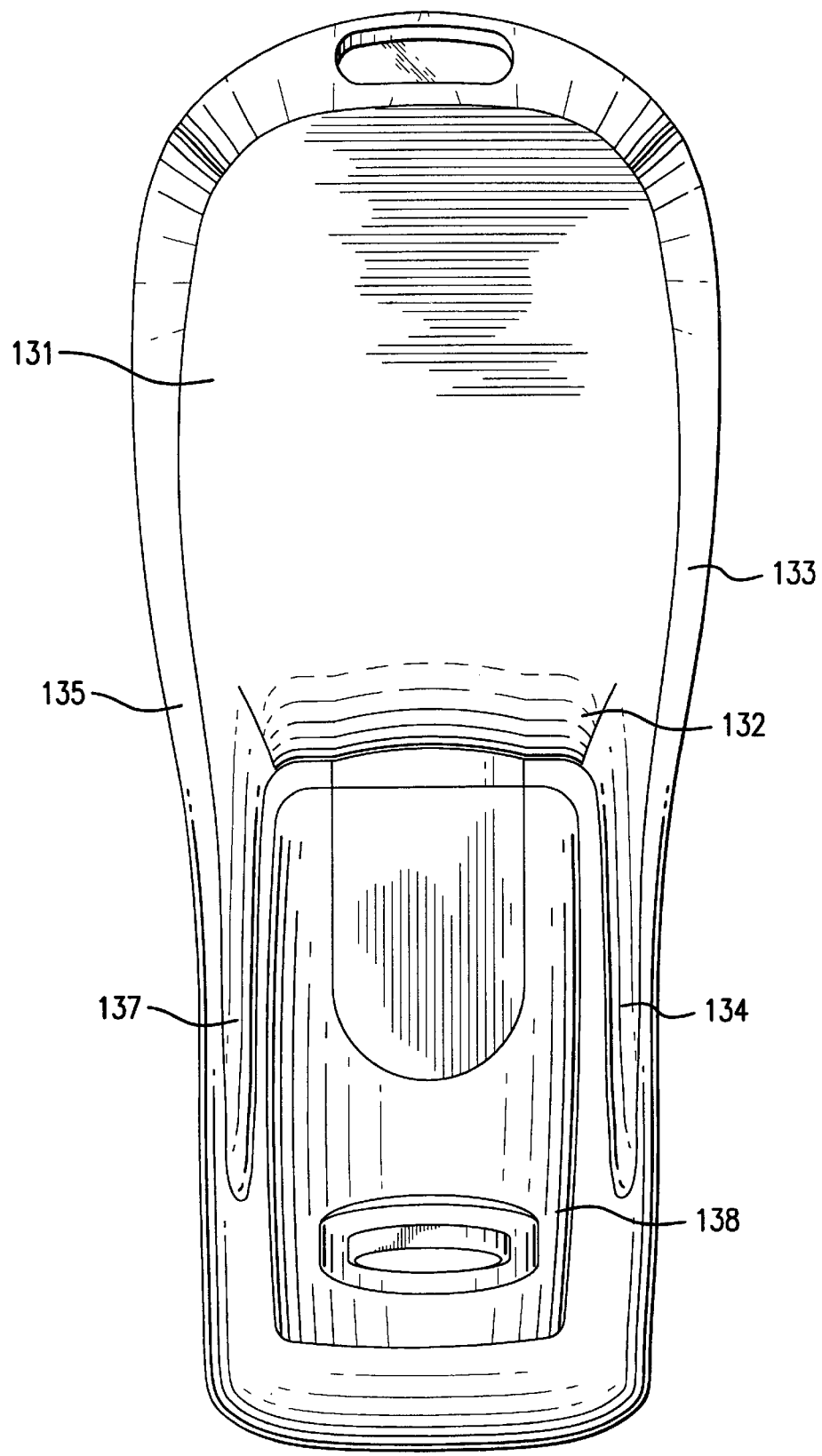
FIG. 18 is a bottom view of a variant of the housing of FIG. 13.
Figure 19:
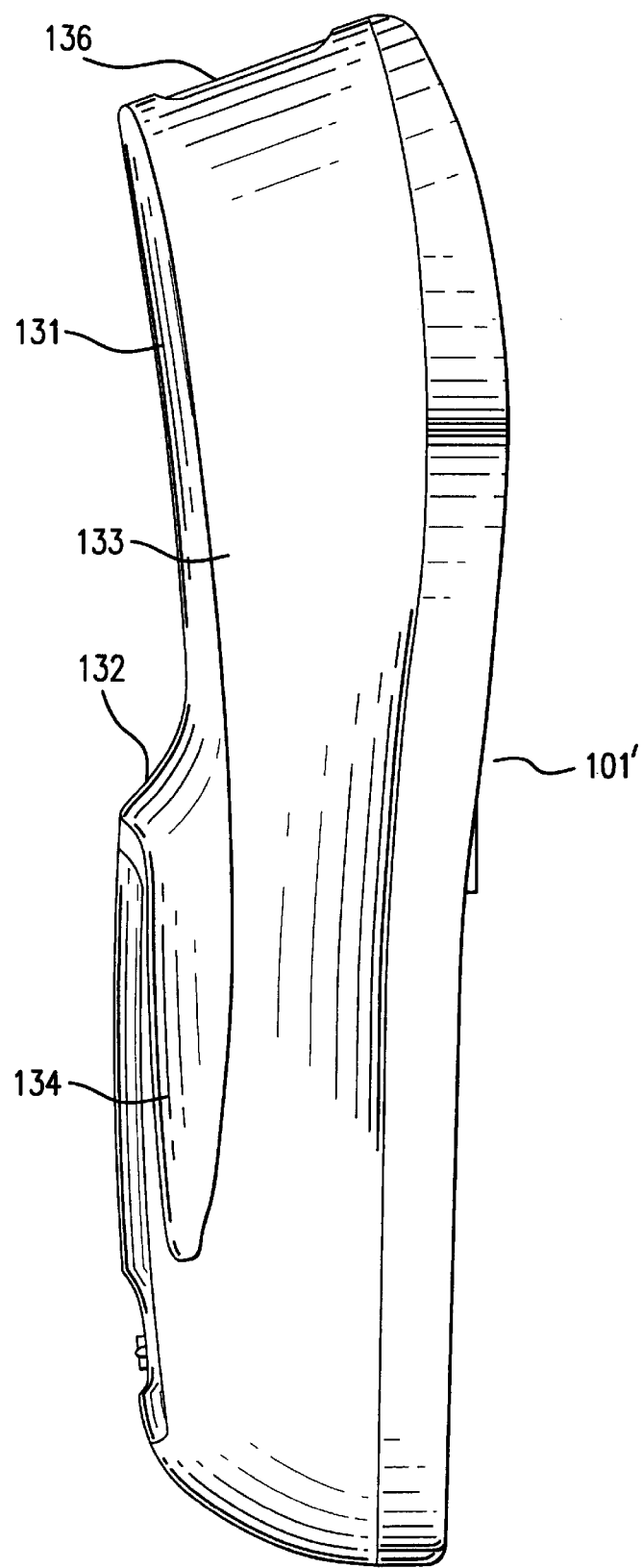
FIG. 19 is a side view of the housing of FIG. 18.
Figure 23:
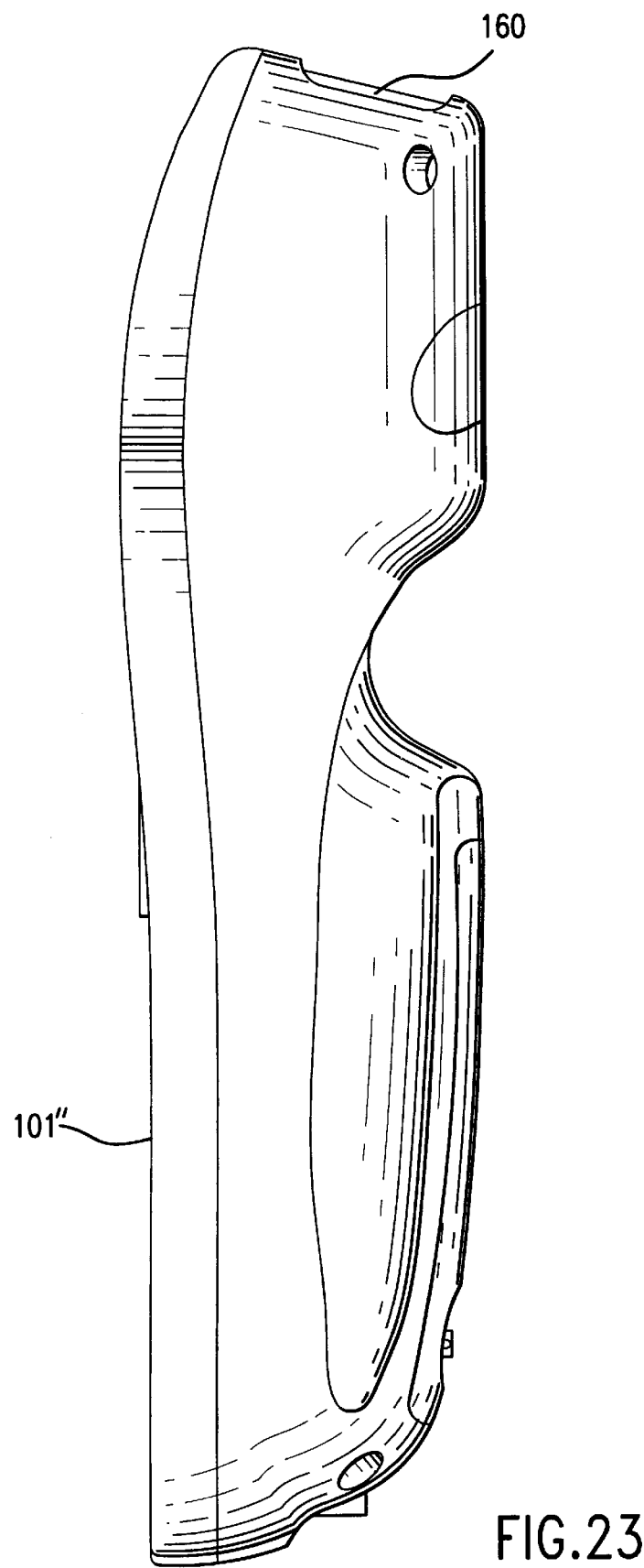
FIG. 23 is a side view of the housing of FIG. 22.
Figure 24:
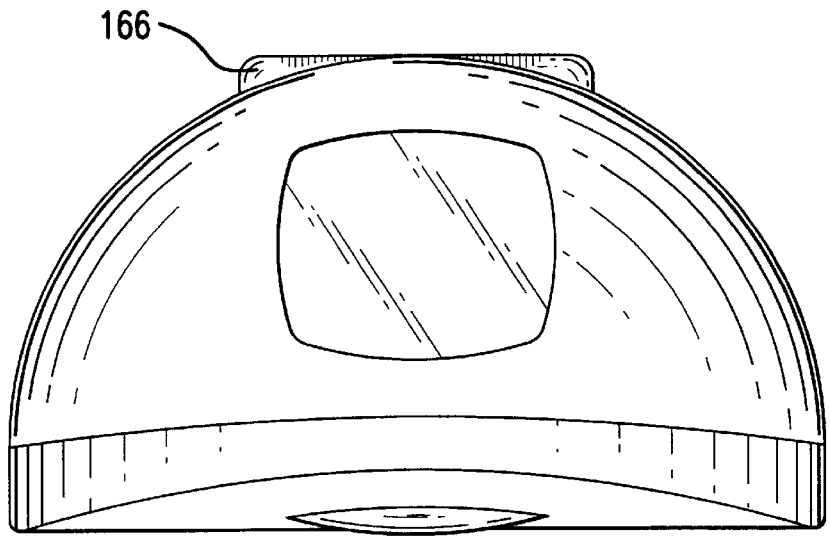
FIG. 24 is a front end view of the housing of FIGS. 22–23.
Figure 25:
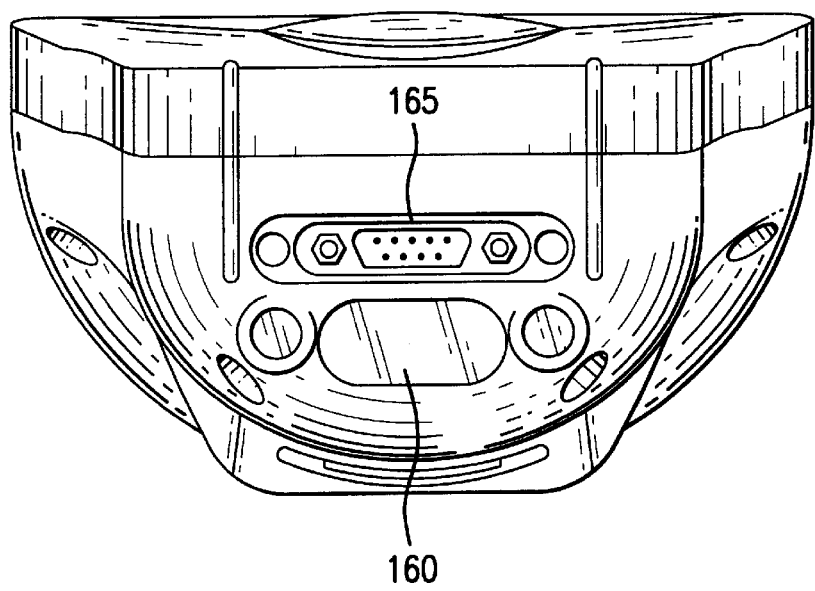
FIG. 25 is a rear end of the housing of FIGS. 22–24.

The grooves 113, 114 extend, in this embodiment, substantially to the rear portion of the upper and lower surfaces, although, it can be to a lesser extent, as shown in FIG. 18, or to a greater extent, as shown in FIG. 23.

The side surfaces of the housing taper gradually inwardly from the top surface to the bottom surface to enable the unit to be held comfortably even by someone having a small hand.

The aforementioned thumb activated switch 104 is disposed opposite the groove 112 so that the thumb opposes the finger F during actuation.

The bottom surface also includes a mechanism for connecting straps 163 or 164 to secure the terminal in the user's hand during use.

The mechanism for the straps that is provided includes recessed fasteners 161 and 162 disposed on the side surfaces at the front end of the housing and the recessed fastener 160 at the rear end of the lower surface. The fasteners are recessed to below the surface of the unit and enable the straps to be connected for either use by a left handed person or a right handed person and so that the straps are disposed at a diagonal and cover the portion of the user's fingers between the knuckles K and the first joint J to provide a secure support.

The bottom surface also includes a rest 115 extending downwardly therefrom which together with the surface 115A on battery compartment door 117 provide a stable positioning of the housing when it is placed on a planar surface.

The front ends of the housing includes the scanning output window 116 from which a scanning beam for a one dimensional or a two dimensional scanner and light reflected from indicia can be input and output to the scanner positioned in the housing.

The bottom surface further includes a removable battery door 117 and a mechanism 118 for releasing the door. The release is a manually actuated button which operates in a conventional manner.

Figure 26:
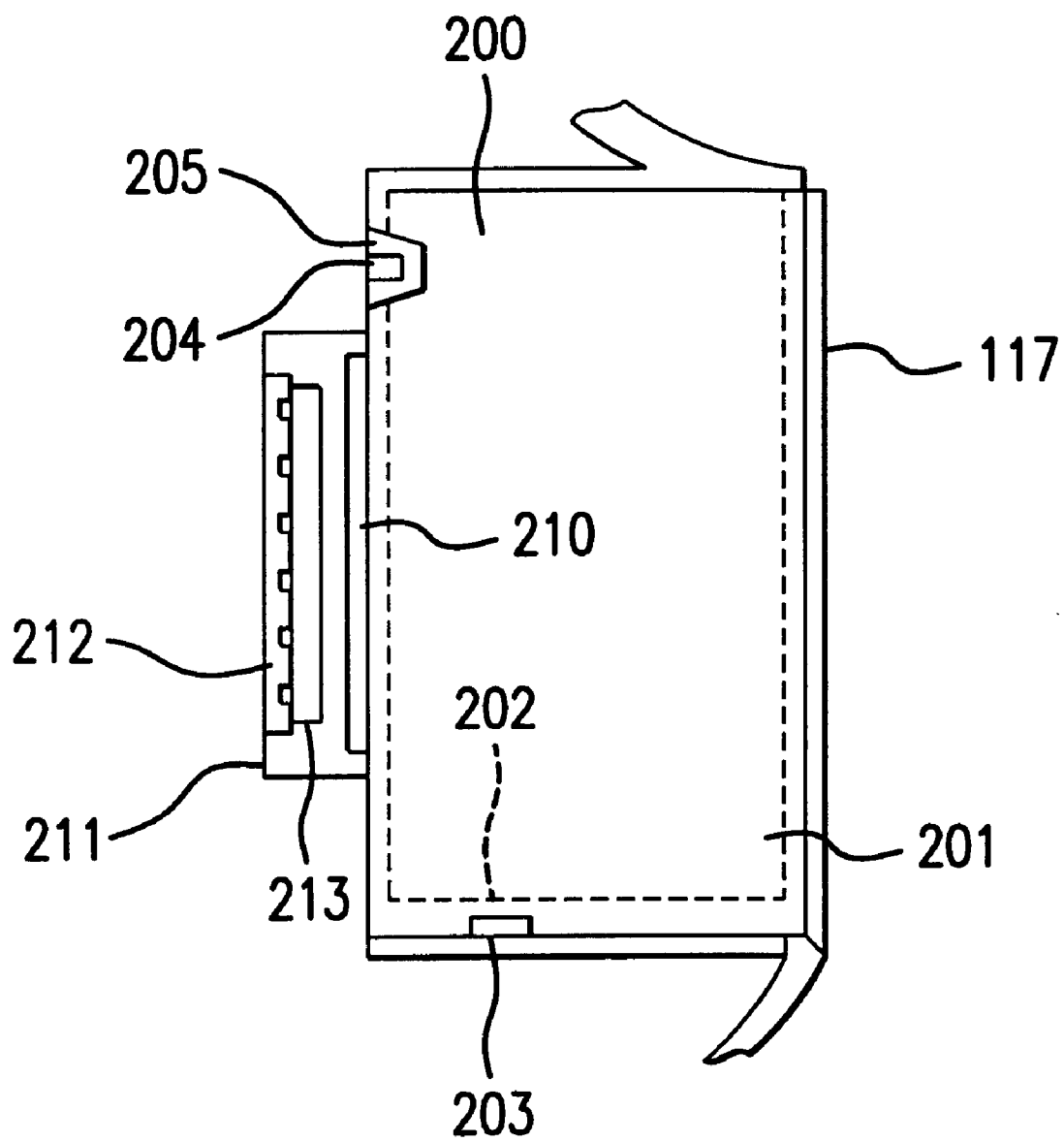
FIG. 26 is a sectional view of a portion of the housing of FIGS. 13–25.

Within the housing and beneath the door 117 is a chamber 200 in which a battery pack 201 is inserted. Referring to FIG. 26, the battery pack includes contacts 202 which make contact with contacts 203 within the chamber 200 to supply power to the scanner. In accordance with the present invention, a movable sensor 204 is situated at the bottom of the chamber and is surrounded by a flexible sealing member 205. When the battery pack 201 is inserted in the chamber 200 and contacts 202 are in contact with contacts 203, the sensor 204 is depressed and the circuitry in the scanner is signaled that the battery pack is in place. This sensor provides the ability to prevent the inadvertent destruction of data if the battery pack were to be removed while the terminal or scanner is still on. In accordance with the invention, if one attempts to remove the battery pack while the power is on to the unit, the sensor will detect the removal of the battery pack before contacts 202 and 203 are disconnected from each other. This enables the circuitry within the unit to save the data and power down before the data is destroyed.

In a further embodiment of the present invention, the bottom of the battery chamber 200 has a removable door 210 which reveals a second chamber 211 in which a SIMM socket 212 is located. The SIMM socket receives an integrated circuit 213 therein for programming the unit to operate in a particular manner. The door 210 is preferably sealingly received so as to avoid the entry of any substances that might be detrimental to the operation of the SIMM device 213.

Referring back to FIGS. 13–17, the upper surface 101 of the housing includes affront portion 110 which slopes gently downwardly from the front surface. This configuration enables the unit to be grasped from the front surface between the thumb and the forefinger. When the unit is held in this manner, one may be able to write on the LED display 106 which is preferably a touch sensitive screen which is able to capture a signature or the like.

The terminal described above is also advantageously used to transmit and receive data using wireless communications. Accordingly, the terminal has communication circuitry therein and optionally an antenna 250 as shown in FIG. 13.

The communication circuitry implements WAN and/or LAN connectivity using protocols such as GSM, Datatac, CDPD, CDPD/Amps and Mobitex.

Figure 13:
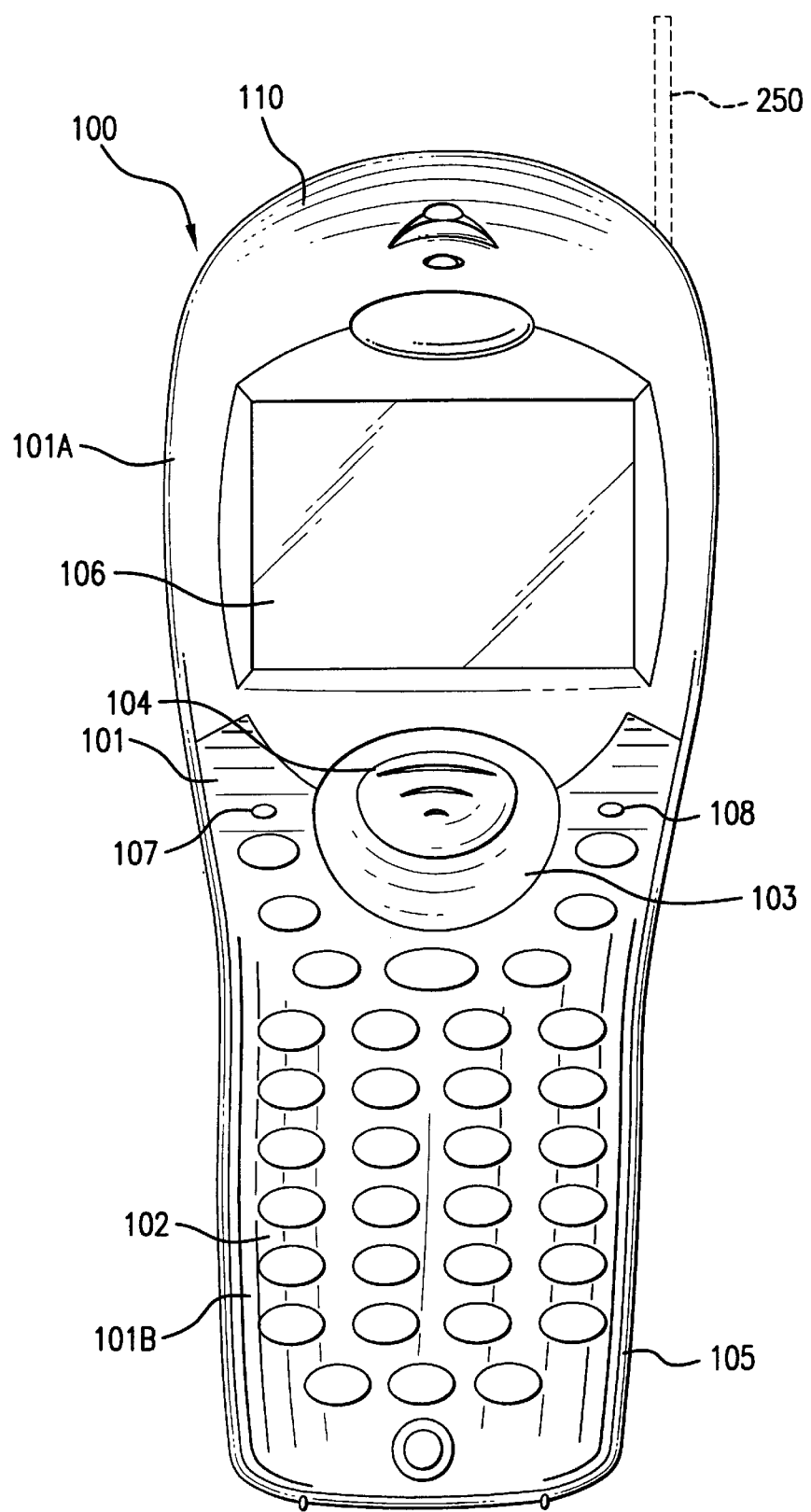
FIG. 13 is a front view of a housing for a hand held scanner or optical reader for reading indicia, such as barcode symbol.
Figure 14:
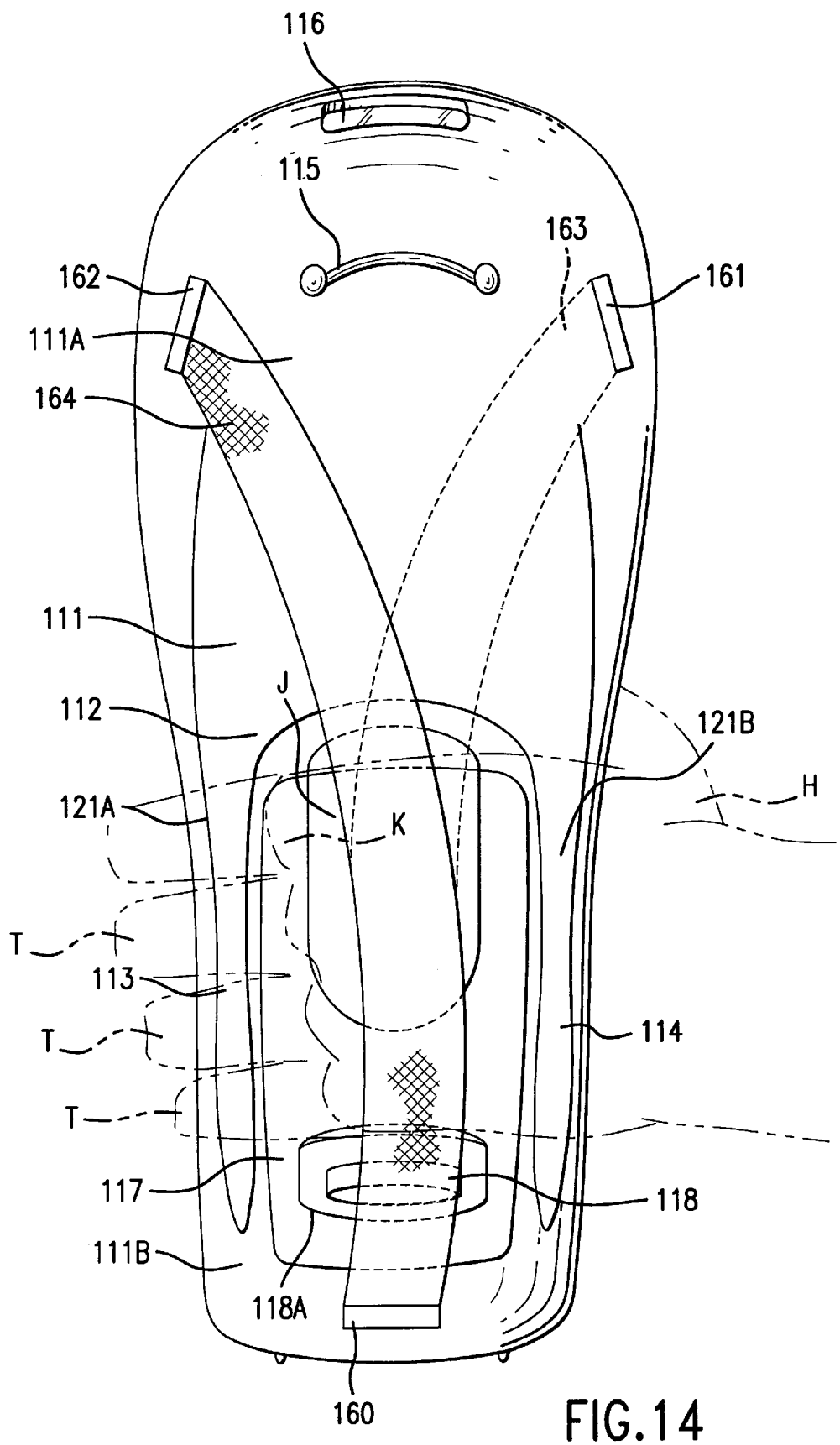
FIG. 14 is the rear view of the housing of FIG. 13.
Figure 15:
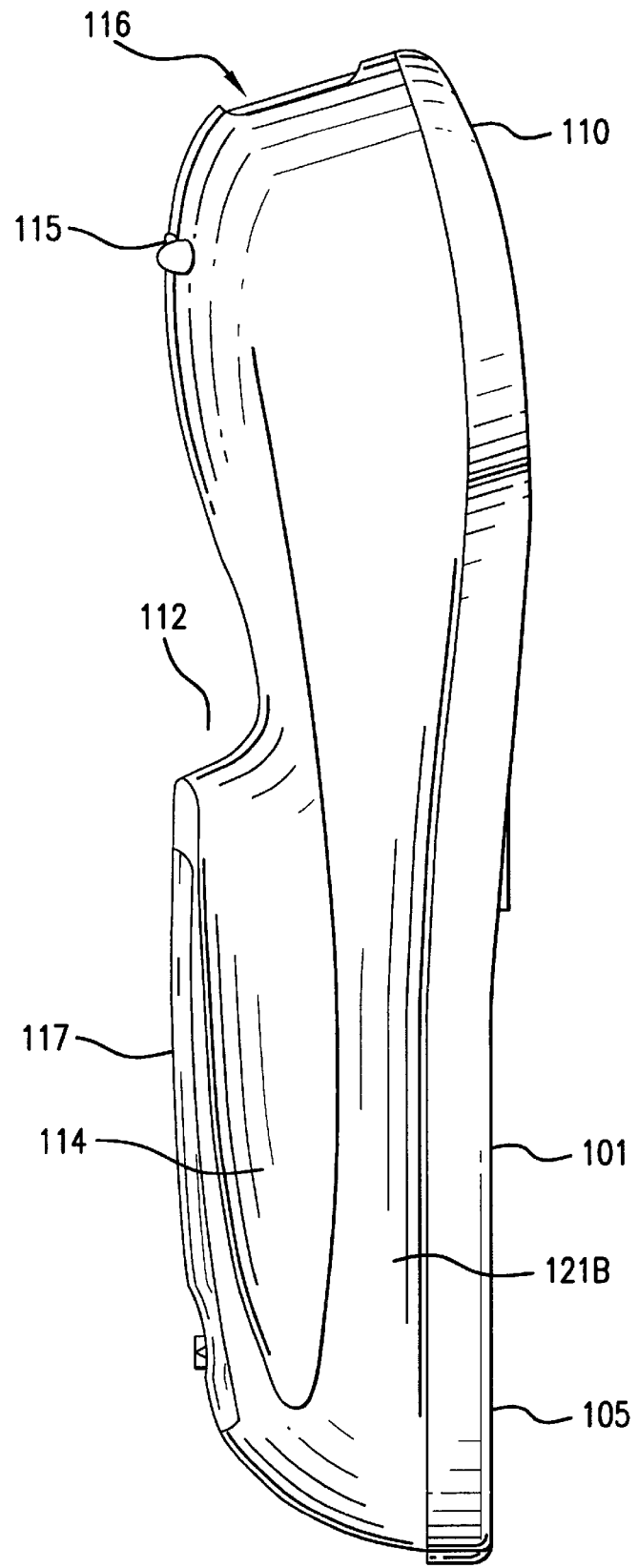
FIG. 15 is a side view of the housing of FIGS. 13 and 14.
Figure 16:
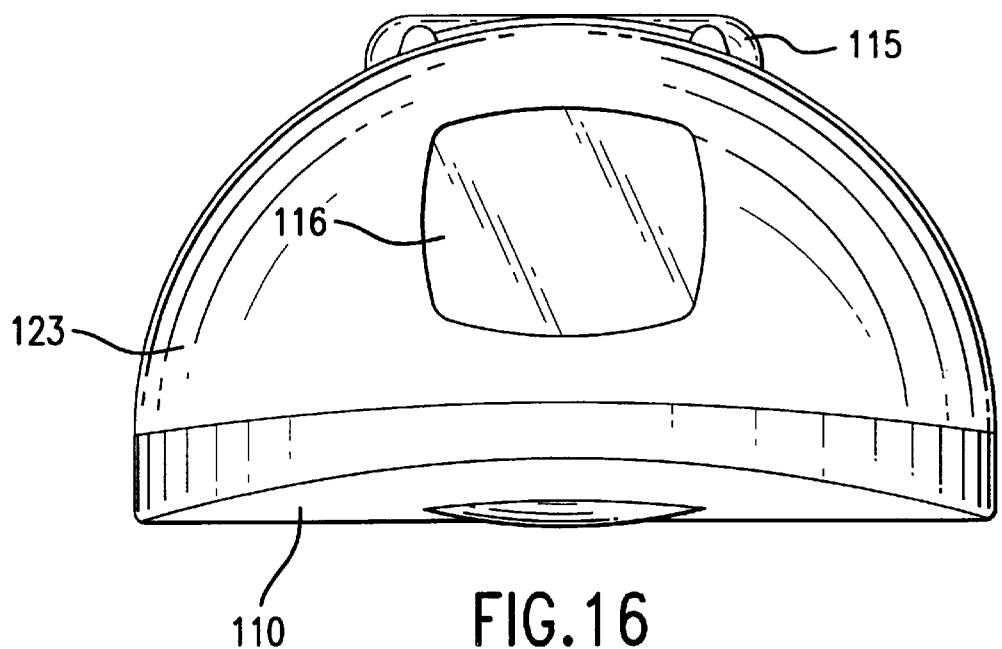
FIG. 16 is a front end view of the housing of FIGS. 13–15.
Figure 17:
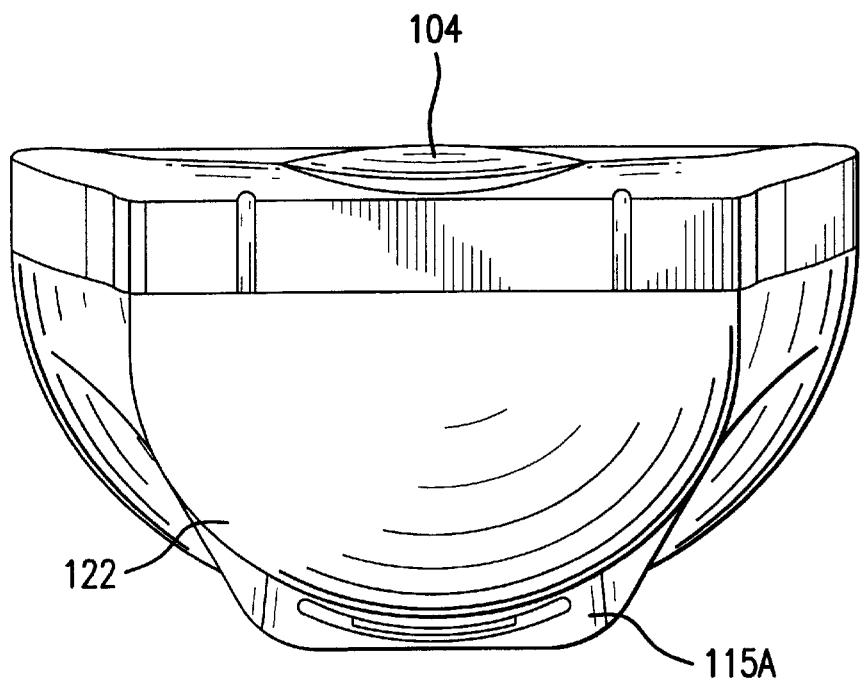
FIG. 17 is a rear end view of the housing of FIGS. 13–16.

FIG. 18 shows an alternative embodiment of the terminal of FIG. 13, having the same top surface shown in FIG. 13 but having different bottom, sides, front ends and rear end surfaces, as shown in FIGS. 18–21. The bottom surface includes groove 132 and second grooves 134 and 137 extending therefrom and a relatively flat front portion of the bottom surface 131. The top surface 101' has the same gentle slope at the front end thereof. The front of the scanner has the window 136 for outputting light and for receiving light at the front end 141. The rear end 142 is rounded as shown.

Figure 20:
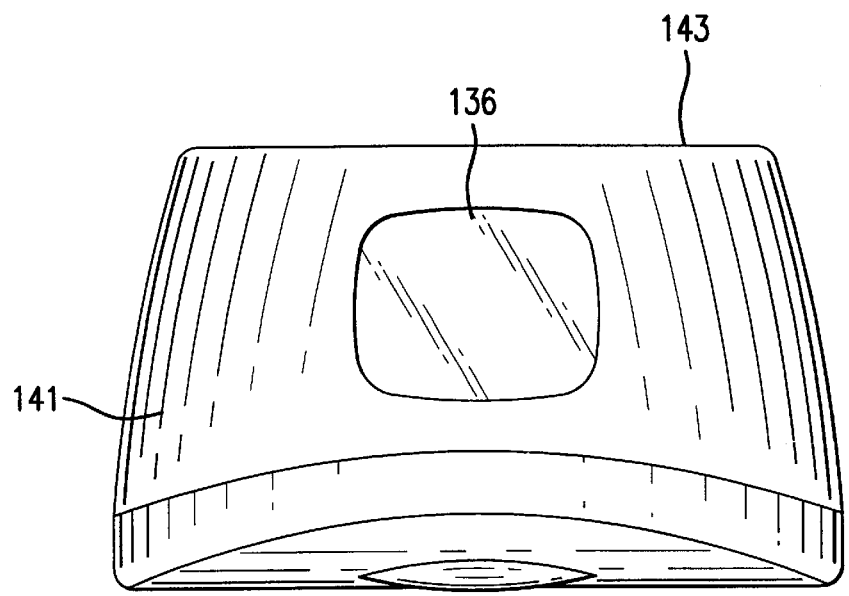
FIG. 20 is a front end view of the housing of FIGS. 18–19.
Figure 21:
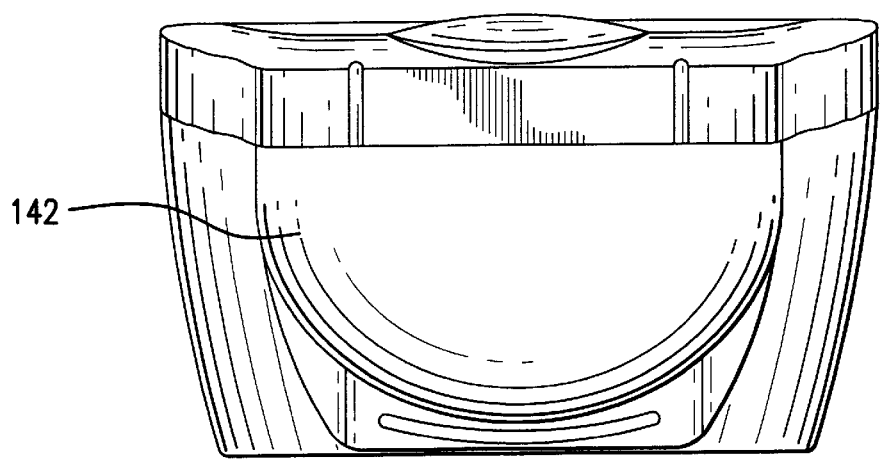
FIG. 21 is a rear end view of the housing of FIGS. 18–20.

The front of the bottom surface 143 shown in FIG. 20 is configured so that the device will sit in a stable position on a planar surface when rested thereon.

FIGS. 22–25 illustrate another embodiment of the housing according to the present invention wherein the top surface 101" is the same as that shown in FIG. 13, but it has an alternative bottom, side, rear and front surfaces.

Figure 22:
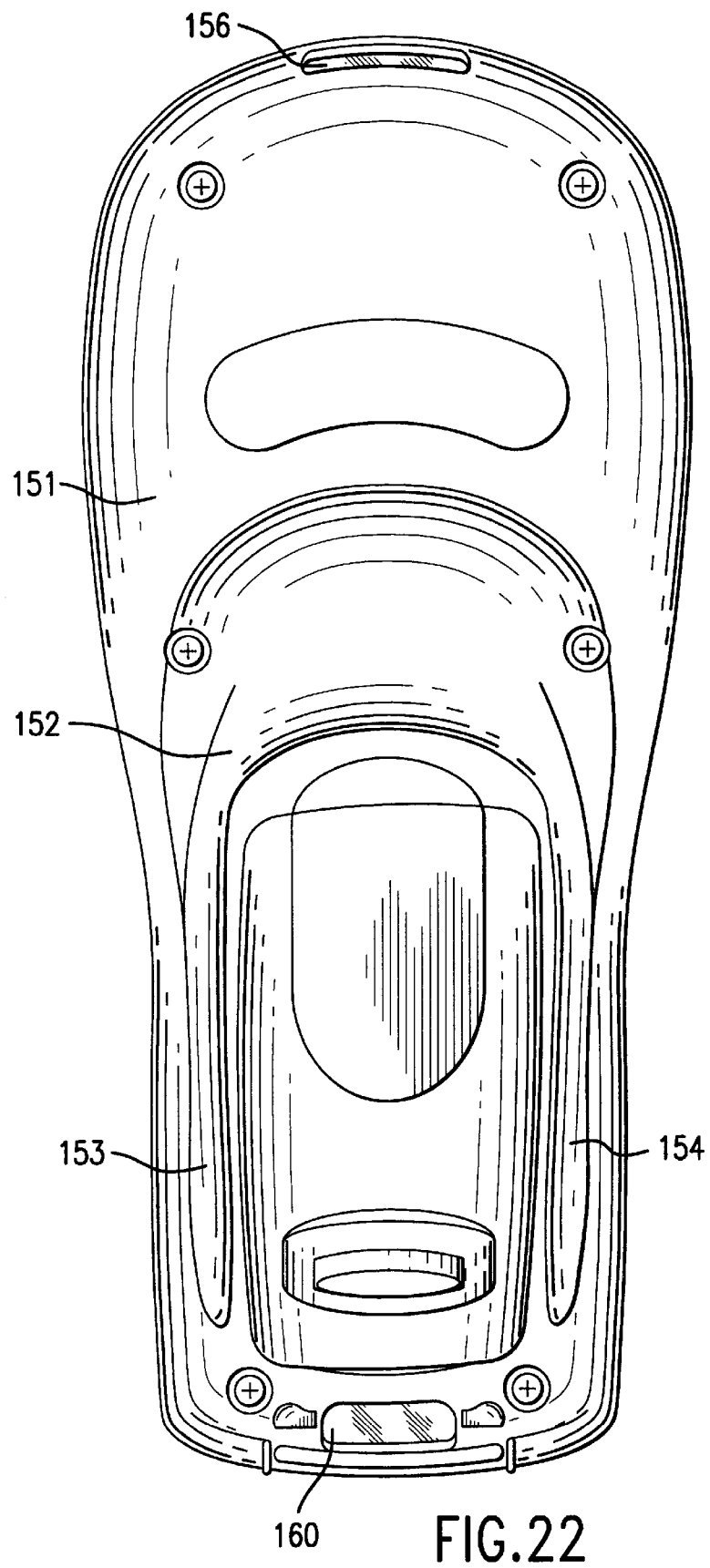
FIG. 22 is a bottom view of an alternative of the housing of FIG. 13.
Figure 27:
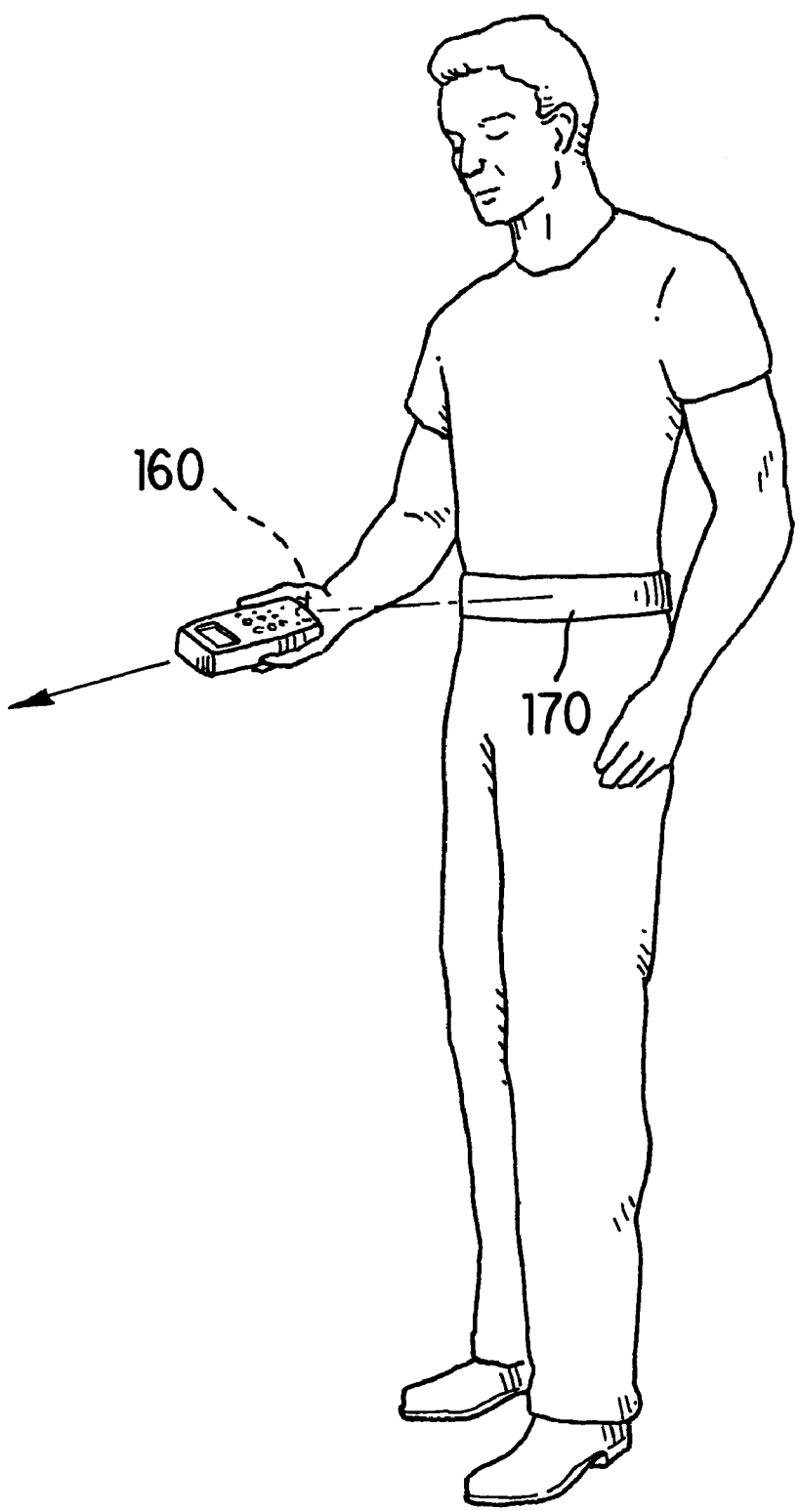
FIG. 27 is a schematic representation of a user holding the housing of FIGS. 13–25 during use and wearing a belt pack.

In this embodiment, there is a groove 152 and second grooves 153 and 154 in bottom surface 151. The housing also includes the window 156 for the scanner, as well as a window 160 for an infrared outlet beam. The housing is configured so that when the unit of FIG. 22 is held in a user's hand as shown in FIG. 27, as a scanner, the IR port 160 is in a direct line of sight with an IR receiver in a belt pack worn by the user. The rear end of the device also includes an RS 232 port 165 for outputting data and a rest 166 so that the device can sit in a stable position on a planar surface.

What is claimed is:

1. A housing for a hand-held scanner, comprising: an upper surface having a front portion and a rear portion; a lower surface having a front portion and a rear portion; side surfaces between the upper and lower surfaces; a first groove in the lower surface between the front portion and rear portion for receiving a finger of a hand holding the housing during use; and wherein the side surfaces have second grooves therein extending from the first groove towards the rear portion of the upper and lower surfaces and substantially to the rear portion of the upper and lower surfaces to receive the tips of at least two fingers of a hand holding the housing during use;

the lower surface having a first fastener thereon for a strap disposed at the rear portion thereof and second fasteners for the strap at the side surfaces adjacent the front portion of the lower surface, whereby a strap fastened between the first fastener and one of the second fasteners is at a diagonal and extends over fingers of a hand holding the housing between the knuckles and the first joints thereof.

2. The housing according to claim 1, wherein the size of the upper surface is greater than the size of the lower surface and the side surfaces taper gradually from the upper surface to the lower surface.

3. The housing according to claim 1, wherein the upper surface has a thumb activated switch disposed substantially opposite the first groove in the lower surface.

4. The housing according to claim 1, wherein the upper surface has a keyboard at the rear portion thereof and a flange extending upwardly from the rear surface and at least partially surrounding the keyboard.

5. The housing according to claim 1, wherein the front portion of the lower surface is rounded and has a rest extending therefrom to maintain the housing in a stable position when placed on a planar surface.

6. The housing according to claim 1, further comprising a scanner for one-dimensional scanning.

7. The housing according to claim 1, further comprising a scanner for two-dimensional scanning.

8. The housing according to claim 1, wherein a rear surface between the upper and lower surfaces has an infrared outlet and wherein the housing is configured to form a direct line of sight from the infrared outlet to a belt pack worn by a user holding the housing in one hand.

9. The housing according to claim 1, wherein the lower surface has a battery chamber for receiving a battery pack and including contacts for connecting to contacts on the battery pack and a sensor in the battery chamber sensing the removal of the battery pack from the battery chamber before the contacts of the battery pack disconnect from the contacts in the battery chamber.

10. The housing according to claim 9, wherein the battery sensor is sealed.

11. The housing according to claim 1, wherein the lower surface has a battery chamber for receiving a battery pack and an integrated circuit socket in the bottom of the chamber and covered by a removable door for receiving an integrated circuit.

* * * * *

UNITED STATES PATENT AND TRADEMARK OFFICE
CERTIFICATE OF CORRECTION

PATENT NO. : 6,543,695 B1  Page 1 of 1
APPLICATION NO. : 09/538812
DATED : April 8, 2003
INVENTOR(S) : Hamilton et al.

It is certified that error appears in the above-identified patent and that said Letters Patent is hereby corrected as shown below:

On Title Page
Item 63 should read:

This application is a continuation of U.S. Patent Application Serial No. 08/916,605, filed August 22, 1997, now abandoned, which is a continuation of U.S. Patent Application Serial No. 08/691,263, filed August 2, 1996, now abandoned. This application is also a continuation-in-part of U.S. Patent Application Serial Nos. 29/116,604, now U.S. Patent No. D431,562, 29/116,597, now U.S. Patent No. D430,159, 29/116,589, now U.S. Patent No. D430,158 and 29/116,606, now U.S. Patent No. D436,104, all filed January 6, 2000. U.S. Patent Application Serial No. 09/359,019, now abandoned, is also a continuation of U.S. Patent Application Serial No. 08/916,605.

Signed and Sealed this

Fifteenth Day of January, 2008

JON W. DUDAS
*Director of the United States Patent and Trademark Office*